United States Patent
De Lagrange et al.

(10) Patent No.: US 11,812,021 B2
(45) Date of Patent: *Nov. 7, 2023

(54) CODING OF QUANTIZATION MATRICES USING PARAMETRIC MODELS

(71) Applicant: InterDigital CE Patent Holdings, SAS, Paris (FR)

(72) Inventors: Philippe De Lagrange, Cesson-Sevigne (FR); Ya Chen, Cesson-Sevigne (FR); Edouard Francois, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,967

(22) Filed: Aug. 18, 2022

(65) Prior Publication Data

US 2023/0007257 A1 Jan. 5, 2023

Related U.S. Application Data

(63) Continuation of application No. 17/267,014, filed as application No. PCT/US2019/045687 on Aug. 8, 2019, now Pat. No. 11,457,214.

(30) Foreign Application Priority Data

Aug. 23, 2018 (EP) ..................................... 18306135
Sep. 17, 2018 (EP) ..................................... 18306212

(51) Int. Cl.
*H04N 19/124* (2014.01)
*H04N 19/159* (2014.01)
(Continued)

(52) U.S. Cl.
CPC ......... *H04N 19/124* (2014.11); *H04N 19/159* (2014.11); *H04N 19/18* (2014.11); *H04N 19/197* (2014.11)

(58) Field of Classification Search
CPC .... H04N 19/124; H04N 19/159; H04N 19/18; H04N 19/197; H04N 19/196; H04N 19/126; H04N 19/46; H04N 19/70
See application file for complete search history.

(56) References Cited

U.S. PATENT DOCUMENTS 6,067,515 A 5/2000 Cong et al.
6,219,642 B1 4/2001 Asghar et al.
(Continued)

OTHER PUBLICATIONS

Ehsan Maani et al., "Parametrization of Default Quantization Matrices"; JCTVC-G352, Joint Collaborative Team on Video Coding (JCT-VC) of ITU-T SG16 WP3 and ISO/IEC JTC1/SC29/WG1 1, 7th Meeting: Geneva, CH, pp. 1-6, No. 2011 (Year: 2011).*

(Continued)

*Primary Examiner* — Dramos Kalapodas
(74) *Attorney, Agent, or Firm* — Xiaoan Lu

(57) ABSTRACT

Quantization matrix can be used to adjust quantization of transform coefficients at different frequencies. In one embodiment, a single fixed parametric model, such as a polynomial is used to represent a quantization matrix. Modulation of bit cost and complexity is achieved by specifying only the n first polynomial coefficients, the remaining ones being implicitly set to zero or other default values. One form of the single fixed polynomial is a fully developed polynomial in (x,y), where x,y indicate the coordinates of a given coefficient in a quantization matrix, with terms ordered by increasing exponent. Since higher exponents are the last ones, reducing the number of polynomial coefficients reduces the degree of the polynomial, hence its complexity. The polynomial coefficients can be symmetrical (Continued)

in x and y, and thus reducing the number of polynomial coefficients that need to be signaled in the bitstream.

20 Claims, 16 Drawing Sheets

(51) Int. Cl.
*H04N 19/18* (2014.01)
*H04N 19/196* (2014.01)

(56) References Cited

U.S. PATENT DOCUMENTS

| | | | |
|---|---|---|---|
| 6,243,497 | B1 | 6/2001 | Chiang et al. |
| 7,965,896 | B2 | 6/2011 | Tanizawa et al. |
| 8,326,068 | B1* | 12/2012 | Zhang .................. H04N 19/126 382/239 |
| 9,467,710 | B2 | 10/2016 | Lim et al. |
| 9,762,917 | B2 | 9/2017 | Zheng et al. |
| 2010/0074518 | A1 | 3/2010 | Tanizawa et al. |
| 2012/0201297 | A1 | 8/2012 | Lim et al. |
| 2012/0287998 | A1* | 11/2012 | Sato ....................... H04N 19/61 375/E7.243 |
| 2013/0188691 | A1* | 7/2013 | Haque .................. H04N 19/126 375/240.03 |
| 2013/0322527 | A1* | 12/2013 | Guo ...................... H04N 19/136 375/240.03 |
| 2016/0198162 | A1 | 7/2016 | Zheng et al. |
| 2017/0332098 | A1* | 11/2017 | Rusanovskyy ...... H04N 19/126 |
| 2018/0278934 | A1 | 9/2018 | Andersson et al. |
| 2018/0376148 | A1 | 12/2018 | Zhang et al. |
| 2019/0289290 | A1* | 9/2019 | Kawamura .......... H04N 19/597 |
| 2020/0077090 | A1 | 3/2020 | Wennersten et al. |
| 2020/0128243 | A1 | 4/2020 | Wang et al. |

OTHER PUBLICATIONS

Jeong et al., Hendry, "HVS-based Generalized Quantization Matrices", Document: JCTVC-I0518, Joint Collaborative Team on Video Coding (JCT-VC) of ITU-T SG 16 WP 3 and ISO/IEC JTC 1/SC 29/WG 11, 9th Meeting: Geneva, CH, pp. 1-8, Apr. 27-May 7, 2012.
Suzuki, et al., "Report on Quantization Matrices Subject Viewing", Document: JCTVC-H0730, Joint Collaborative Team on Video Coding (JCT-VC) of ITU-T SG16 WP3 and ISO/IEC JTC1/SC29/WG11 8th Meeting: San Jose, CA, USA, pp. 1-9, Feb. 1-10, 2012.
Joshi et al., "Compression and signaling of quantizer matrices", Document: JCTVC-G578, Joint Collaborative Team on Video Coding (JCT-VC) of ITU-SG16 WP3 and ISO/IEC/SC29/WG11, 7th Meeting: Geneva, CH, pp. 1-4, Nov. 21-30, 2011.
Joshi et al., "Quantization matrix entries as QP offsets", Document: JCTVC-I0284_r1, Joint Collaborative Team on Video Coding (JCT-VC) of ITU-T SG16 WP3 and ISO/IEC JTC1/SC29/WG11, 9th Meeting: Geneva, CH, pp. 1-4, Apr. 27-May 7, 2012.
Tanaka et al., "Quantization Matrix for HEVC, Document": JCTVC-E073, Joint Collaborative Team on Video Coding (JCT-VC) of ITU-T SG16 WP3 and ISO/IEC JTC1/SC29/WG11, 5th Meeting: Geneva, CH, pp. 1-24, Mar. 2011.
Maani et al., "Parameterization of Default Quantization Matrices, Document": JCTVC-G352, Joint Collaborative Team on Video Coding (JCT-VC) of ITU-T SG16 WP3 and Iso/Iec JTC1/SC29/WG11, 7th Meeting: Geneva, CH, pp. 1-6, Nov. 21-30, 2011.
Chang et al., "Designing JPEG Quantization Tables Based on Human Visual System", Department of Computer Science National, Tsing Hua University, Hsinchu 300, Taiwan, pp. 376-380, IEEE, 1999.
Wang et al., "CE4: Subtest 2.4 Layered quantization matrices representation and compression", Document JCTVC-H0314, Joint Collaborative Team on Video Coding (JCT-VC) of ITU-T SG-16 WP3 and ISO/IEC JTC1/SC29/WG11, 8th Meeting: San Jose, CA, USA, pp. 1-13, Feb. 1-10, 2012.
Sato, et al., "Necessity of Quantization Matrices Compression in HEVC", Document: JCTVC-E056, Joint Collaborative Team on Video Coding (JCT-VC) of ITU-T SG16 WP3 and ISO/IEC JTC1/SC29/WG11, 5th Meeting:Geneva, CH, pp. 1-4, Mar. 16-23, 2011.
Haque, et. al, "High-level Syntaxes for the Scaling List Matrices Parameters and Parametric coding", Document: JCTVC-H0460, Joint Collaborative Team on Video Coding (JCT-VC) of ITU-T SG16 WP3 and ISO/IEC JTC1/SC29/WG11, 8th Meeting: San Jose, CA, USA, pp. 1-6, Feb. 1-10, 2012.
Wang, et al., Non-CE4: Layered quantization matrices compression, Document: JCTVC-G530, Joint Collaborative Team on Video Coding (JCT-VC) of ITU-T SG16 WP3 and ISO/IEC JTC1/SC29/WG11, 7th Meeting: Geneva, pp. 1-11, Nov. 21-30, 2011.
Haque, et al., "HVS Model based Default Quantization Matrices", Document: JCTVC-G880, Joint Collaborative Team on Video Coding (JCT-VC) of ITU-SG16-WP3 and ISO/IEC JTC1/SC29/WG11, 7th Meeting: Geneva, CH, pp. 1-12, Nov. 21-30, 2011.
Tanaka et al., "Quantization Matrix for HEVC", Document: JCTVC-E073, Joint Collaborative Team on Video Coding (JCT-VC) of ITU-T SG16 WP3 and ISO/IEC JTC1/SC29/WG11, 5th Meeting: Geneva, CH, pp. 1-24, Mar. 16-23, 2011.
Korodi et al., QuYK: A Universal, Lossless Compression Method for Quantization Matrices, Document: JCTVC-E45,Joint Collaborative Team on Video Coding (JCT-VC) of ITU-T SG16 WP3 and ISO/IEC JTC1/SC29/WG11, 5th Meeting: Gevena, pp. 1-13, Mar. 16-23, 2011.
Cammas et al, "Description of video coding technology proposal by France Telecom, NTT, NTT DOCOMO, Pansonic and Technicolor", Document: JCTVC-A114, Joint Collaborative Team on Video Coding (JCT-VC) of ITU-SG16 WP3 and ISO/IEC JTC1/SC29/WG11, 1st Meeting: Dresden, DE, pp. 1-42, Apr. 15-23, 2010.
Zhou, et al., "Compact representation of quantization matrices for HEVC", Document: JCTVC-D024, Joint Collaborative Team on Video Coding (JCT-VC) of ITU-T SG16 WP3 and ISO/IEC JTC1/SC29/WG11, 4th Meeting: Daegu, Korea, pp. 1-9, Jan. 2011.
Hoang et al., "Flexible scaling of quantization parameter", Document: JCTVC-C135_r1, Joint Collaborative Team on Video Coding (JCT-VC) of ITU-T SG16 WP3 and ISO/IEC JTC1/SC29/WG11, 3rd Meeting: Guangzhou, CN, pp. 1-5, Oct. 7-15, 2010.
Joshi et al., CE4 Subtest 2.5: "Coding of quantization matrices based on modified predication and mapping to unsigned values", Document: JCTVC-H0451, Joint Collaborative Team on Video Coding (JCT-VC) of ITU-T SG16 WP3 and ISO/IEC JTC1/SC29/WG11, 8th Meeting: San Jose, CA, USA, pp. 1-6, Feb. 1-10, 2012.

\* cited by examiner

CODING OF QUANTIZATION MATRICES USING PARAMETRIC MODELS

CROSS-REFERENCE TO RELATED APPLICATIONS

This application is a Continuation of U.S. application Ser. No. 17/267,014, filed Feb. 8, 2021, which is a National Phase entry under 35 U.S.C. § 371 of International Application No. PCT/US2019/045687, filed Aug. 8, 2019, which claims the benefit of European Patent Application No. 18306212.4, filed Sep. 17, 2018 and European Patent Application No. 18306135.7 filed Aug. 23, 2018, the entirety of which is incorporated by reference herein.

TECHNICAL FIELD

The present embodiments generally relate to a method and an apparatus for video encoding or decoding, and more particularly, to a method and an apparatus for coding quantization matrices in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method for video decoding is presented, comprising: accessing a parametric model that is based on a sequence of parameters; determining a plurality of parameters that correspond to a subset of said sequence of parameters; associating each parameter of said plurality of parameters with a corresponding parameter of said subset of said sequence of parameters, to represent a quantization matrix; de-quantizing transform coefficients of a block of an image based on said quantization matrix; and reconstructing said block of said image responsive to said de-quantized transform coefficients.

According to another embodiment, a method for video encoding is presented, comprising: accessing a parametric model that is based on a sequence of parameters; determining a plurality of parameters that correspond to a subset of said sequence of parameters; associating each parameter of said plurality of parameters with a corresponding parameter of said subset of said sequence of parameters, to represent a quantization matrix; quantizing transform coefficients of a block of an image based on said quantization matrix; and entropy encoding quantized transform coefficients.

According to another embodiment, an apparatus for video decoding is presented, comprising: means for accessing a parametric model that is based on a sequence of parameters; means for determining a plurality of parameters that correspond to a subset of said sequence of parameters; means for associating each parameter of said plurality of parameters with a corresponding parameter of said subset of said sequence of parameters, to represent a quantization matrix; means for de-quantizing transform coefficients of a block of an image based on said quantization matrix; and means for reconstructing said block of said image responsive to said de-quantized transform coefficients.

According to another embodiment, an apparatus for video encoding is presented, comprising: means for accessing a parametric model that is based on a sequence of parameters; means for determining a plurality of parameters that correspond to a subset of said sequence of parameters; means for associating each parameter of said plurality of parameters with a corresponding parameter of said subset of said sequence of parameters, to represent a quantization matrix; means for quantizing transform coefficients of a block of an image based on said quantization matrix; and means for entropy encoding quantized transform coefficients.

According to another embodiment, an apparatus for video decoding is presented, comprising one or more processors, wherein said one or more processors are configured to: access a parametric model that is based on a sequence of parameters; determine a plurality of parameters that correspond to a subset of said sequence of parameters; associate each parameter of said plurality of parameters with a corresponding parameter of said subset of said sequence of parameters, to represent a quantization matrix; de-quantize transform coefficients of a block of an image based on said quantization matrix; and reconstruct said block of said image responsive to said de-quantized transform coefficients. The apparatus can further comprise one or more memories coupled to said one or more processors.

According to another embodiment, an apparatus for video encoding is presented, comprising one or more processors, wherein said one or more processors are configured to: access a parametric model that is based on a sequence of parameters; determine a plurality of parameters that correspond to a subset of said sequence of parameters; associate each parameter of said plurality of parameters with a corresponding parameter of said subset of said sequence of parameters, to represent a quantization matrix; quantize transform coefficients of a block of an image based on said quantization matrix; and entropy encode quantized transform coefficients. The apparatus can further comprise one or more memories coupled to said one or more processors.

According to another embodiment, a signal is formatted to include: a value indicating a number of parameters in a plurality of parameters; said plurality of parameters, wherein each parameter of said plurality of parameters is associated with a corresponding parameter of a subset of a sequence of parameters, to represent a quantization matrix, wherein a parametric model is based on said sequence of parameters; and transform coefficients of a block of an image quantized based on said quantization matrix.

DETAILED DESCRIPTION

Figure 1:
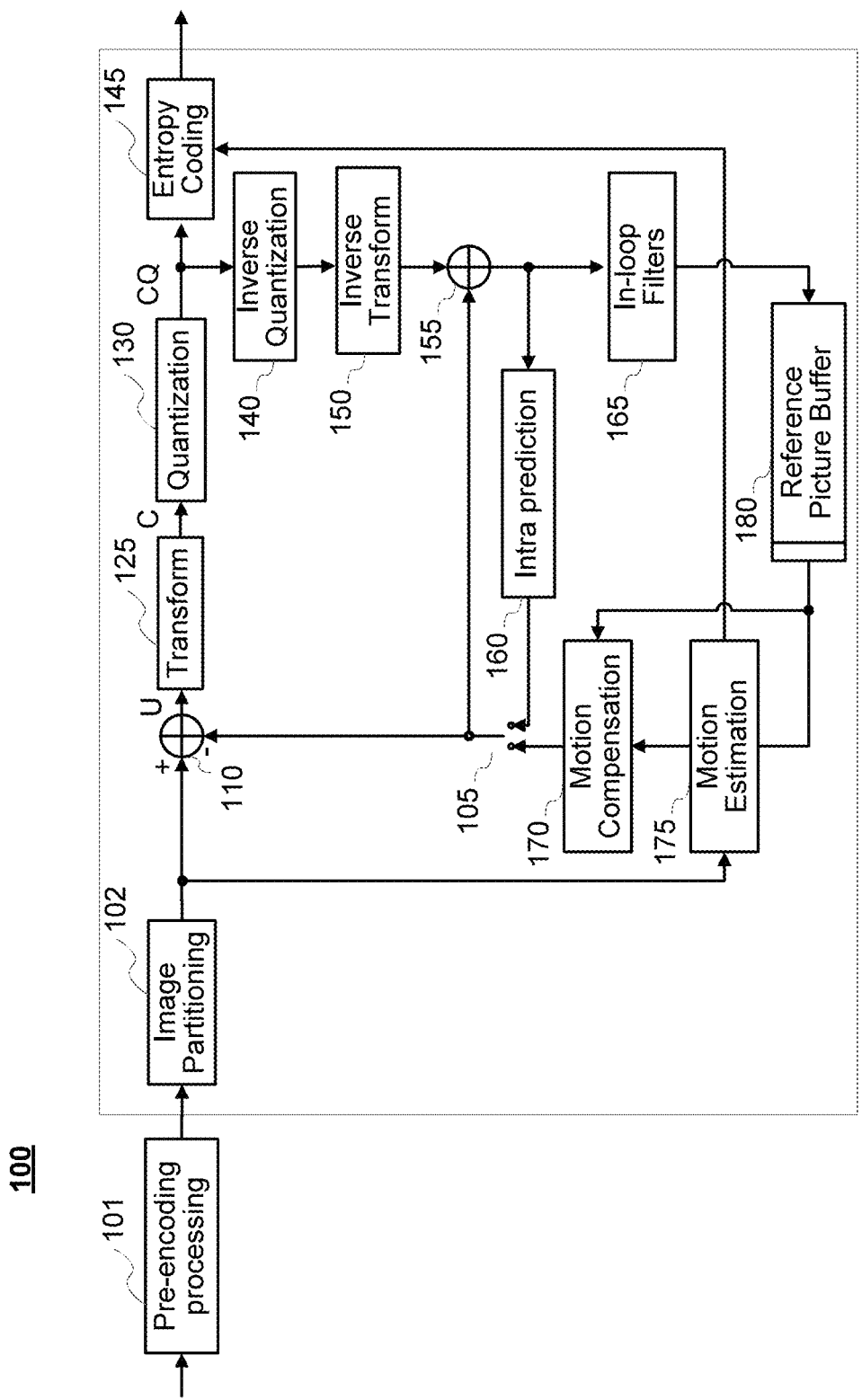
FIG. 1 illustrates a block diagram of an embodiment of a video encoder.

FIG. 1 illustrates an exemplary video encoder 100, such as a High Efficiency Video Coding (HEVC) encoder. FIG. 1 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
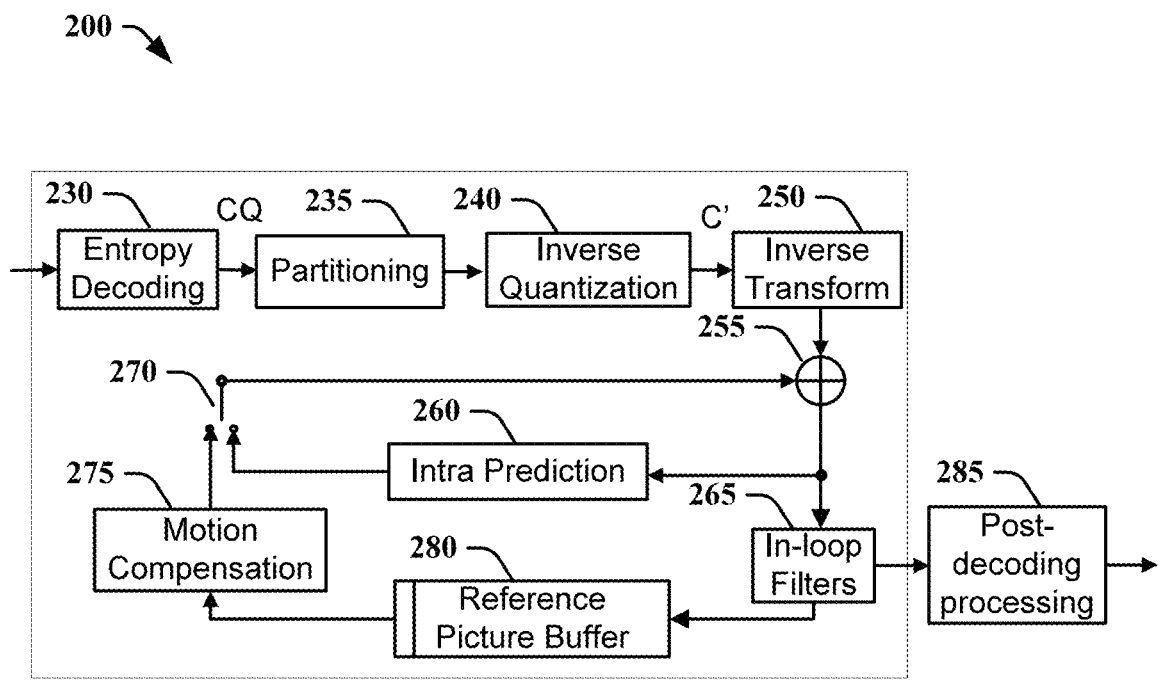
FIG. 2 illustrates a block diagram of an embodiment of a video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a VVC decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). In-loop filters (265) are applied to the reconstructed image. The filtered image is stored at a reference picture buffer (280). The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
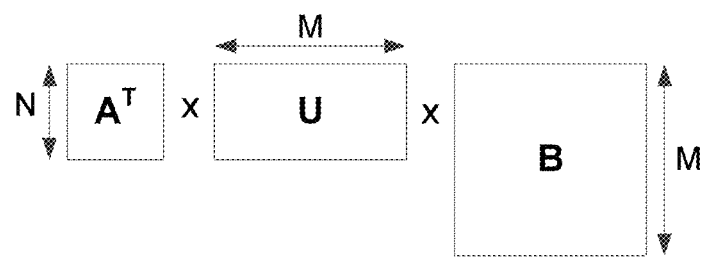
FIG. 3 is a pictorial example illustrating 2D separable transform.

As described above, the prediction residuals are transformed and quantized. Considering an M×N (M columns×N rows) residual block ($[U]_{M \times N}$) that is input to a 2D M×N forward transform, the 2D transform is typically implemented by applying an N-point transform to each column (i.e., vertical transform) and an M-point transform to each row (i.e., horizontal transform) separately, as illustrated in FIG. 3. Mathematically, the forward transform can be expressed as:

$$[C]_{M \times N} = [A]^T_{N \times N} \times [U]_{M \times N} \times [B]_{M \times M}$$

where $[A]_{N \times N}$ is the N-point transform matrix applied vertically, and $[B]_{M \times M}$ the M-point transform matrix applied horizontally, and "T" (superscript) is the matrix transposition operator. Thus, the separable transform consists in applying the horizontal and vertical transforms successively on each row and each column of the 2D residual block.

In HEVC, the 2D transforms use the same separable transform for both horizontal and vertical filtering. In other words, matrix B is same as matrix A:

$$[C]_{M \times N} = [A]^T_{N \times N} \times [U]_{M \times N} \times [A]_{M \times M}$$

Note that in HEVC, only square transforms are supported, which means N=M.

The resulting M×N transform coefficients ($[C]_{M \times N}$) are then subject to quantization to obtain quantized transform coefficients ($[CQ]_{M \times N}$). In HEVC, Uniform Reconstruction Quantization (URQ) is used for quantization, which is conceptually equivalent to division by quantization step size (Qstep). More generally for video encoding, it should be noted that other quantization methods may be used, for example, by further considering a quantization rounding offset or using non-uniform quantization.

To quantize the transform coefficients, in HEVC, the encoder can specify, for each transform block size and separately for intra and inter prediction, a customized quantization (scaling) matrix (QM) for use in inverse-quantization scaling by the decoder. The quantization matrix is typically designed to provide more accuracy to coefficients corresponding to frequencies more sensitive to human perception. The goal is to adapt the quantization of the transform coefficients to improve the perceptual quality of the coded video, typically by taking into account the properties of the human visual system to different spatial frequencies of the signal. For example, low frequencies are less quantized than the high frequencies.

Using the quantization matrix generally does not improve objective fidelity as measured by mean-squared error (or, equivalently, PSNR), but it usually improves subjective fidelity. Default values for the quantization scaling matrices are specified in the standard, and the encoder can also choose to use customized values by sending a representation of those values at the sequence or picture level.

More specifically, the transform coefficients are quantized according to the scaling values provided in quantization matrices. After the transform is applied to the residual values, luma and chroma transform coefficients in a Transform Block are individually quantized according to the integer scaling values that are present in the intra and inter QMs for the specific component and block size: 6 matrices for each of transform sizes 4×4, 8×8, 16×16, and 2 matrices for 32×32 (chroma in 4:4:4 sampling mode reuses the matrices for 16×16), which makes a total of 20 matrices. To reduce memory storage needs, matrix definition is limited to 8×8 resolution: full matrices for transform sizes 16×16 and 32×32 are obtained by 2×2 and 4×4 sample repetition, respectively.

The HEVC specification defines default intra and inter QMs in HEVC, that are based on human visual model. If the default matrices are not used as indicated using flags, ad hoc matrices explicitly signaled in the bitstream can be used.

The elements in the QMs apply different quantization scaling to transform coefficients at different frequencies in a Transform Block. Therefore, these QMs possess the capacity to control the quantization step size, and thus to adjust the quantization according to the frequency of the transform coefficient. A Transform Block contains DC and AC transform coefficients, where the DC transform coefficient is the lowest frequency component and the AC coefficients correspond to frequency components from low, medium to high. Because low frequency transform coefficients are usually more important for video signal reconstruction, the default QMs in HEVC apply coarser quantization to medium and high frequency AC transform coefficients.

The quantization at the encoder side is not normative and can be done in different ways. Nevertheless, it typically reproduces or approximates the following formula for an HEVC encoder:

$$CQ[x][y] = \text{sign}(C[x][y]) * (\text{abs}(C[x][y]) * \text{invScale}[QP\%6] / QM[x][y] + \text{quantOffset}) >> \text{quantShift}$$

where
CQ is the block of quantized coefficients,
C is the block of transform coefficients,
QM is the quantization matrix, invScale[k]={26214, 23302, 20560, 18396, 16384, 14564} with k=0, . . . , 5, QP is the quantization parameter, quantShift is a parameter that depends on the scaling involved by the forward transform applied at the encoder, on the transform block size, on the signal bit depth, and on QP.

In the HEVC reference encoder, quantShift=14+QP+TransformShift, where TransformShift relates to the scaling involved by the forward transform, quantOffset is a parameter that depends on parameter quantShift, for instance, quantOffset=1<<(quantShift—1), (x,y) is the location of the coefficient, abs(r) is the absolute value of r, sign(r)=−1 if r<0, 1 otherwise, "*" is the scalar multiplication, "/" is the integer division with truncation of the result toward zero, and "%" is the modulus operator.

At the decoder side, the QM can be applied in the de-quantization conforming to the HEVC specification based on the following formula:

$$C'[x][y]=(CQ[x][y]*QM[x][y]*levScale[QP\%6]<<(QP/6))+(1<<(bdShift-1)))>>bdShift$$

where

CQ is the block of quantized coefficients,

C' is the block of de-quantized coefficients,

QM is the quantization matrix, levScale[k]={40, 45, 51, 57, 64, 72} with k=0, . . . , 5, QP is the quantization parameter, bdShift is defined as follows for the HEVC usual profiles: bdShift=Max(20—bitDepth, 0), bitDepth is the bit depth of the samples of the considered component (e.g., Y, Cb or Cr), (x,y) is the location of the coefficient.

Figure 4:
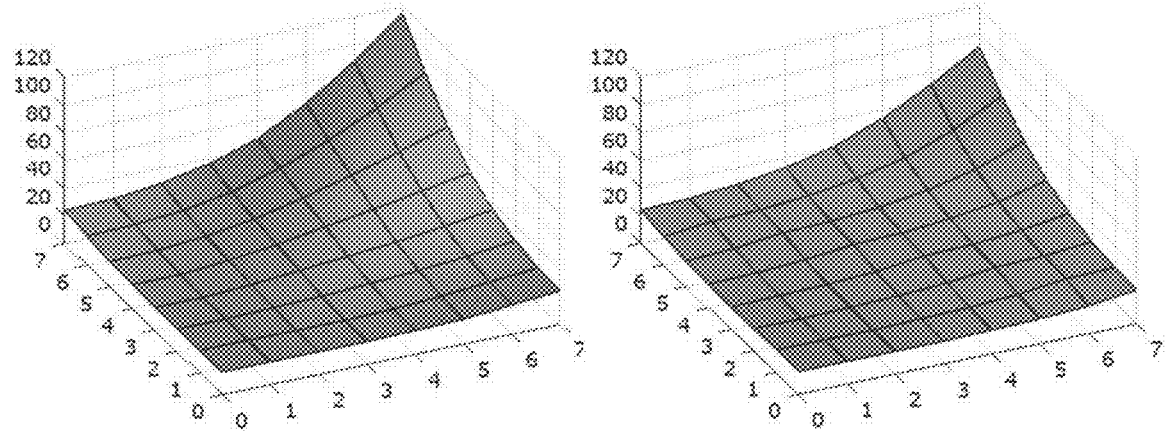
FIG. 4 illustrates the default intra and inter 8×8 quantization matrices (QMs) defined in HEVC.

Default QMs are defined in HEVC for 8×8 transform blocks only, in order to reduce the memory storage needs. The default intra and inter 8×8 QMs defined in HEVC are shown below and illustrated in FIG. 4 (note that they are both symmetric). The QMs for larger blocks are obtained by upsampling the 8×8 QMs. To create a 16×16 QM, each entry in an 8×8 QM is replicated into a 2×2 region. To create a 32×32 QM, each entry in an 8×8 QM is replicated into a 4×4 region. For 4×4 transform blocks, the default QM is flat (all components are equal to 16). The default QMs only depend on the intra/inter mode, but are the same for the Y, Cb and Cr components. The replication rule could also be applied to rectangular blocks (e.g., rectangular blocks in JEM).

$$\begin{pmatrix} 16 & 16 & 16 & 16 & 17 & 18 & 21 & 24 \\ 16 & 16 & 16 & 16 & 17 & 19 & 22 & 25 \\ 16 & 16 & 17 & 18 & 20 & 22 & 25 & 29 \\ 16 & 16 & 18 & 21 & 24 & 27 & 31 & 36 \\ 17 & 17 & 20 & 24 & 30 & 35 & 41 & 47 \\ 18 & 19 & 22 & 27 & 35 & 44 & 54 & 65 \\ 21 & 22 & 25 & 31 & 41 & 54 & 70 & 88 \\ 24 & 25 & 29 & 36 & 47 & 65 & 88 & 115 \end{pmatrix}$$

$$\begin{pmatrix} 16 & 16 & 16 & 16 & 17 & 18 & 20 & 24 \\ 16 & 16 & 16 & 17 & 18 & 20 & 24 & 25 \\ 16 & 16 & 17 & 18 & 20 & 24 & 25 & 28 \\ 16 & 17 & 18 & 20 & 24 & 25 & 28 & 33 \\ 17 & 18 & 20 & 24 & 25 & 28 & 33 & 41 \\ 18 & 20 & 24 & 25 & 28 & 33 & 41 & 54 \\ 20 & 24 & 25 & 28 & 33 & 41 & 54 & 71 \\ 24 & 25 & 28 & 33 & 41 & 54 & 71 & 91 \end{pmatrix}$$

The intra default QM is based on the human visual system, as explained in a patent application by M. Hague et al. (U.S. patent application Ser. No. 13/597,131, Publication No. US2013/0188691, "Quantization matrix design for HEVC standard", hereinafter [US20130188691]) or in an article by Long-Wen Chang et al., entitled "Designing JPEG quantization tables based on human visual system," Signal Processing: Image Communication, Volume 16, Issue 5, pp 501-506, January 2001 (hereinafter [Chang]), and can be derived as explained in the following process. At first, f, the radial frequency in cycles per degree of the visual angle corresponding to the coefficient at location (x,y), is defined as:

$$f(x, y) = \frac{K}{\Delta \cdot 2N} \frac{\sqrt{x^2 + y^2}}{S(\theta)} \text{ where} \quad (1)$$

$$\theta = \arctan\left(\frac{u}{v}\right), S(\theta) = \frac{1-s}{2} * \cos(4\theta) + \frac{1+s}{2},$$

and N is the block width or height (u=0, . . . , N−1, v=0, . . . , N−1, typically N=8), $\Delta$, K and s are constant parameters (to get the HEVC 8×8 QM, A should be set to 0.00025, K to 0.00893588, s to 0.7).

Then the Modulation Transfer Function H(f) is defined as $$H(f) = \begin{cases} 2.2 \cdot (0.192 + 0.114 \cdot f) \cdot \exp(-(0.114 \cdot f)^{1.1}) & \text{if } f > f_{max} \\ 1 & \text{otherwise} \end{cases} \quad (2)$$

where $f_{max}$=8 (cycles per degree). The QM values are computed as Round(16/H(f)) where Round(x) gives the nearest integer value to x.

The inter default QM can be derived from the intra default QM using the following process:

1. QMinter(0,0)=QMintra(0,0)

2. For n=1 . . . N−1

QMinter(0,n)=QMinter(0,n−1)+int(S1*(QMintra(0,n)−QMintra(0,n−1))+0.5),

With S1=0.714285714

3. QMinter(0,N−1)=QMintra(0,N−1)

4. For m=1 . . . N−1

QMinter(m,N−1)=QMinter(m−1,N−1)+int(S3*(QMintra(m,N−1)−QMintra(m−1,N−1))+0.5),

With S3=0.733333333, where int(r) is the nearest integer value of r,

5. For m=1 . . . N−1, For n=0 . . . N−2

QMinter(m, n)=QMinter(m−1, n+1)

The coefficients of the quantization matrices are signaled in the bitstream using scaling lists. There is one scaling list per block size, indexed by the parameter sizeId, and per mode, indexed by the parameter matrixId, both specified as follows:

sizeId=0—block 4×4, 1—block 8×8, 2—block 16×16, 3—block 32×32 matrixId=0—intra Y, 1—intra U, 2—intra V, 3—inter Y, 4—inter U, 5—inter V For 32×32 blocks, matrixId can only be set to 0 or 3.

The syntax in HEVC specification for signaling the scaling list is reproduced as follows.

| scaling_list_data( ) { | Descriptor |
|---|---|
|   for( sizeId = 0; sizeId < 4; sizeId++ ) | |
|     for( matrixId = 0; matrixId < 6; matrixId += ( sizeId = = 3) ? 3 : 1) { | |
|       scaling_list_pred_mode_flag[ sizeId ][ matrixId ] | u(1) |
|       if(! scaling_list_pred_mode_flag_sizeId ][ matrixId ] ) | |
|         scaling_list_pred_matrix_id_delta[ sizeId ][ matrixId ] | ue(v) |
|       else { | |
|         nextCoef = 8 | |
|         coefNum = Min( 64, (1 << (4 + ( sizeId << 1 ) ) ) ) | |
|         if( sizeId > 1) { | |
|           scaling_list_dc_coef_minus8[ sizeId - 2 ][ matrixId ] | se(v) |
|           nextCoef = scaling_list_dc_coef_minus8[ sizeId - 2 ][ matrixId ] + 8 | |
|         } | |
|         for( i = 0; i < coefNum; i++) { | |
|           scaling_list_delta_coef | se(v) |
|           nextCoef = ( nextCoef + scaling_list_delta_coef + 256 ) % 256 | |
|           ScalingList[ sizeId ][ matrixId ][ i ] = nextCoef | |
|         } | |
|       } | |
|     } | |
| } | |

Figure 5:
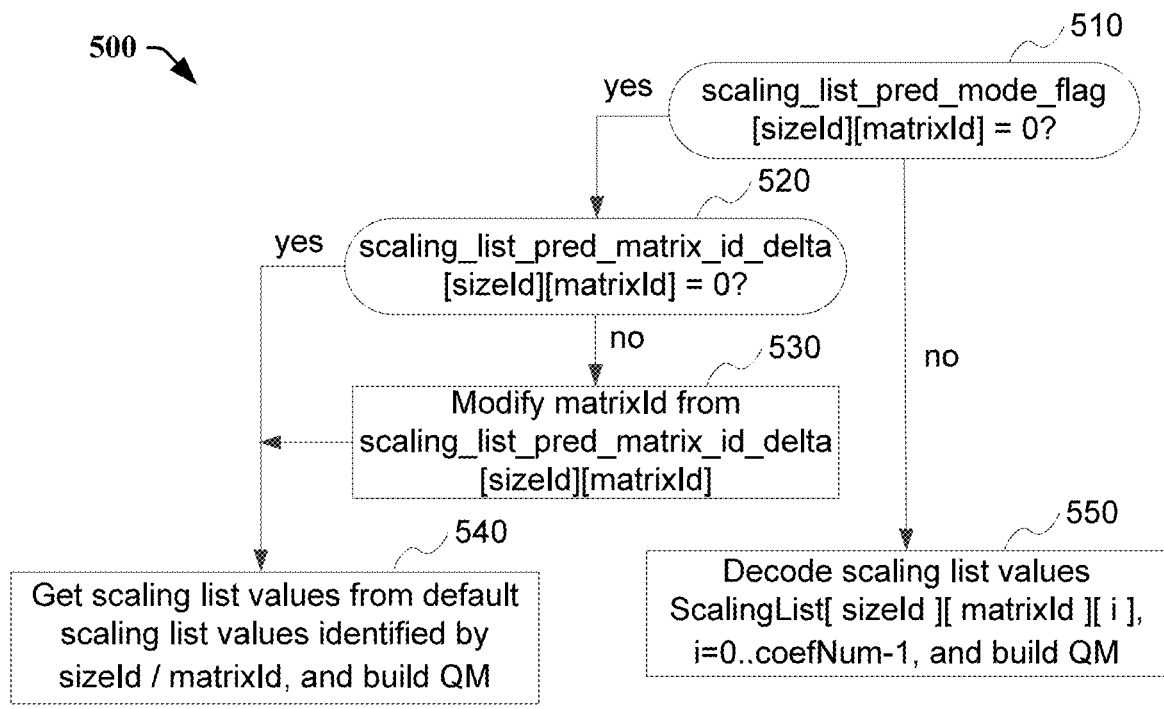
FIG. 5 illustrates a process for determining the QM in HEVC.
Figure 6:
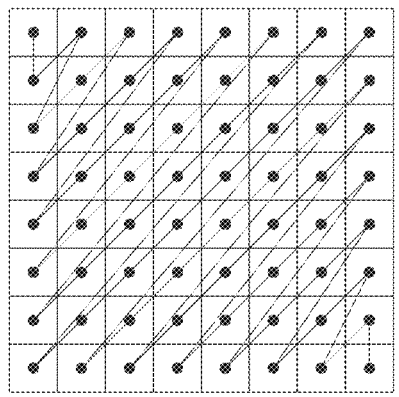
FIG. 6 illustrates the up-right diagonal scanning and the default intra 8×8 QM in HEVC.

For each possible value of the two parameters sizeId and matrixId, process 500 illustrated in FIG. 5 is applied to determine the actual QM from either the default QM, or from explicit decoded values for an exemplary HEVC decoder. At step 510, the decoder checks whether the syntax element scaling_list_pred_mode_flag[sizeId][matrixId] is equal to 0. If not, at step 550, the decoder decodes scaling list values from the variable ScalingList[sizeId][matrixId][i], i=0, . . . , coefNum−1, and builds the QM by the up-right diagonal scanning order as shown in the left of FIG. 6. If scaling_list_pred_mode_flag[sizeId][matrixId] is equal to 0, at step 520, the decoder checks whether the syntax element scaling_list_pred_matrix_id_delta[sizeId][matrixId] is equal to 0. If not, matrixId is modified (530) based on scaling_list_pred_matrix_id_delta[sizeId][matrixId]. At step 540, the scaling list values from the default scaling list values identified by sizeId and matrixId are obtained, and the QM is built, where the default matrix for 8×8 intra is shown in the right of FIG. 6.

As described above, previous video codecs, such as those conforming to HEVC, were based on 2D separable transforms using the same vertical and horizontal transforms. Therefore, the derived QMs were 2D QMs, in general symmetric, adapted to these 2D transforms.

Figure 7:
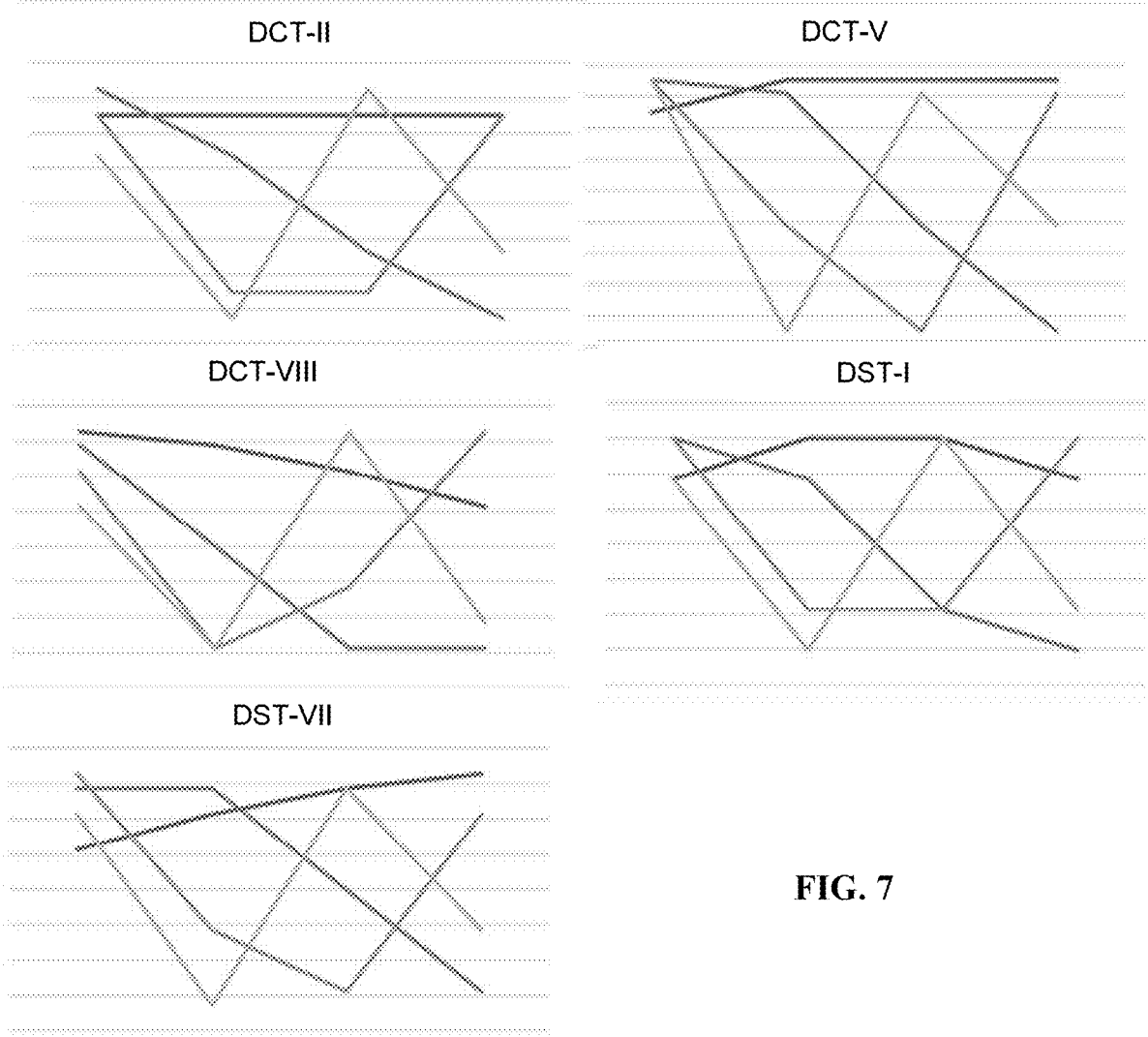
FIG. 7 illustrates different transforms used in JEM (Joint Exploration Model).

However, in the current JEM, five different horizontal/vertical transforms are defined, derived from five transforms as shown in Table 1 and illustrated for 4×4 size in FIG. 7. Flags are used at the CU level, for size from 4×4 to 64×64, to control the combination of transforms. When the CU flag is equal to 0, DCT-II is applied as horizontal and vertical transform. When the CU flag is equal to 1, two additional syntax elements are signalled to identify the horizontal and vertical transforms to be used. Note that other horizontal/vertical transforms could also be considered, such as the identity transform (which corresponds to skipping the transform in one direction).

TABLE 1

Transform basis functions of
DCT-II/V/VIII and DST-I/VII for N-point input in JEM.

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$, where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

For the intra case, the set of possible transforms depends on the intra mode. Three sets are defined as follows:

Set 0: DST-VII, DCT-VIII
Set 1: DST-VII, DST-I
Set 2: DST-VII, DCT-V

For each intra mode and each transform direction (horizontal/vertical), one of these three sets is enabled. For the inter case, only DST-VII and DCT-VIII are enabled, and the same transform is applied for both horizontal and vertical transforms.

Figure 8:
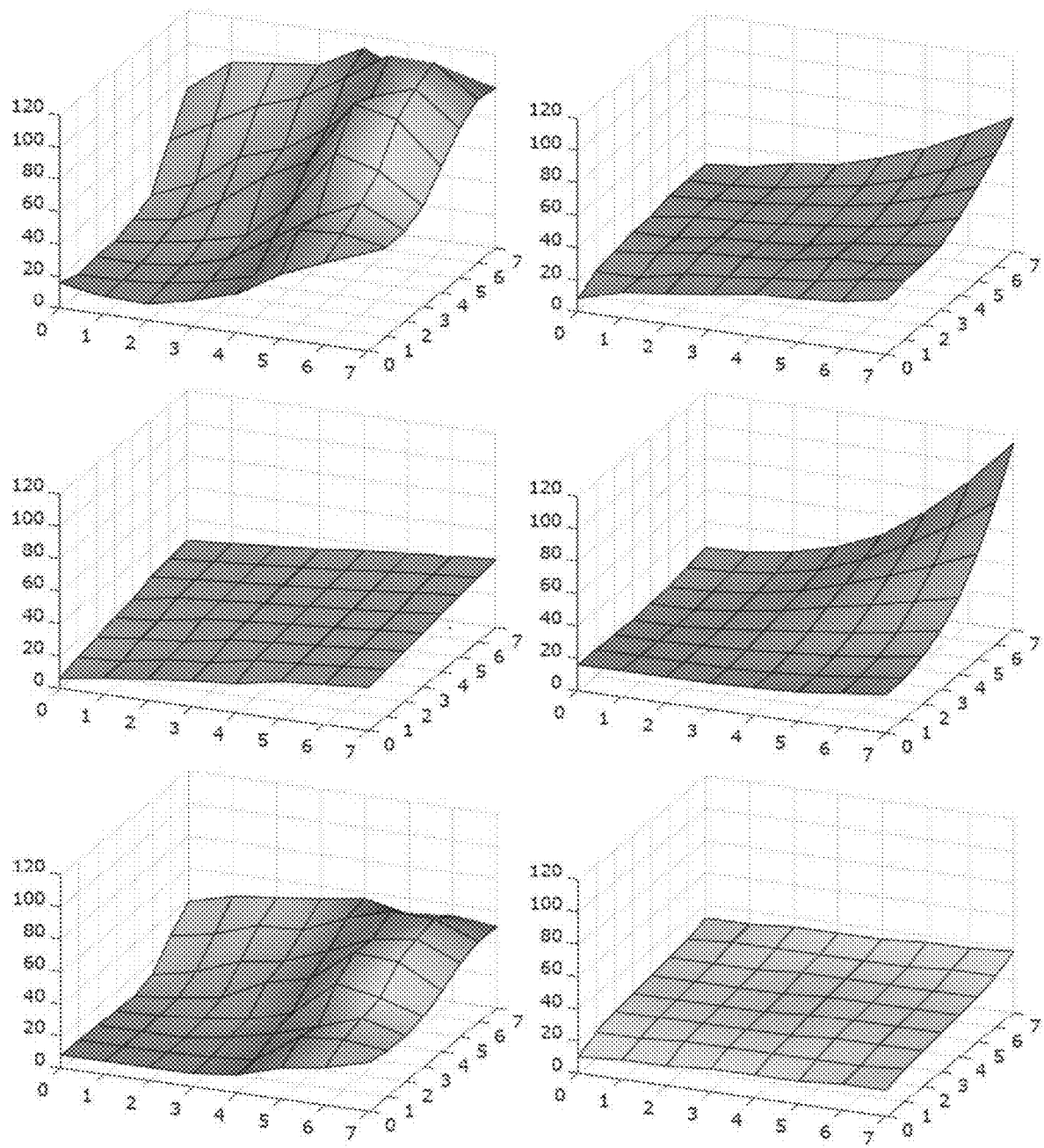
FIG. 8 illustrates the example matrices found in standards and encoders.

As described above, in many codecs, quantization matrices are used. For example, FIG. 8 shows six example matrices found in standards and encoders. From left to right, top to bottom, the matrices are from JPEG, MPEG2-intra, H264-intra, HEVC-intra, an actual DTT H.264 encoder and satellite HEVC broadcast stream. However, as many encoders do not use the default matrices specified in the codec specification, they need to be explicitly coded. The cost of coding such quantization matrices may become significant.

More specifically, one or more of the following problems may arise:

There may be many quantization matrices: the matrices may depend on the horizontal/vertical size of the transform block, the horizontal/vertical transform type, and the coding mode of the Coding Unit containing the transform block; the number of possible combinations may become quite large if considering 4, 8, 16, 32, 64-sized transforms with all rectangular variants, intra/inter, and Y/U/V, this makes 150 matrices (to be compared with 8 for H.264 and 20 for HEVC).

Recent codecs tend to use larger-sized transforms, which in turn require transmitting larger-sized quantization matrices, which means a greater number of coefficients.

As indicated above, one can choose alternate matrices not matching the default ones found in the specification, for psychovisual improvements or other reasons.

The quantization matrix may be asymmetric, for instance to adapt to interlaced content, or anamorphic content.

It may be required to change the quantization matrices per picture, in order to better adjust the quantization parameter (for instance to emulate QP larger than 51, which is the current maximum value specified in AVC and in HEVC, or to emulate fractional QP).

It may be required for the bitrate regulation, to sacrifice some frequencies; this typically appears in "panic mode", when the buffer is close to be full; in this case, it is penalizing to spend many bits to code the quantization matrices.

It may be required to adjust the transform coefficients differently depending on the temporal distance of the temporal frame used for predicting the block (the residual statistics strongly depend on this temporal distance), thus requiring frequent change of quantization matrices.

Even a simple change can be costly if transmission of the full matrix is required.

In current codecs (e.g., H.264 and HEVC), the coding cost of the quantization matrices is somewhat related to their complexity thanks to DPCM coding, but this could be pushed further. Similarly, if prediction is used, coding cost should be related to the complexity of change compared to the predictor.

Another aspect addressed here is that in current codecs, quantization matrix is used as a multiplier in the dequantization process, which adds complexity compared to no-matrix: it needs two multiplications instead of one and increases the dynamic range of intermediate results. Also, the HVS model underlying the default HEVC matrices follows an exponential trend, which is difficult to match with a low complexity model and few parameters.

Some problems have already been studied in JCT-VC, during the development of HEVC. For example, increase of transform sizes and types have raised discussions and proposals around quantization matrices coding efficiency:

Evidence of problem has been provided in an article by K. Sato, H. Sakurai, entitled "Necessity of Quantization Matrices Compression in HEVC," JCTVC-E056, JCT-VC 5th Meeting: Geneva, C H, March 16-23, 2011 (hereinafter [JCTVC-E056]).

An article by M. Zhou, V. Sze, entitled "Compact representation of quantization matrices for HEVC," JCTVC-D024, JCT-VC 4th Meeting: Daegu, Korea, Jan. 20-28, 2011 (hereinafter [JCTVC-D024]), proposed a coding method involving symmetries, subsampling, and linear interpolation.

An article by J. Tanaka, Y. Morigami, and T. Suzuki, entitled "Quantization Matrix for HEVC," JCTVC-E073, JCT-VC 5th Meeting: Geneva, C H, Mar. 16-23, 2011 (hereinafter [JCTVC-E073]), proposed a coding method with optional prediction from linear models, prediction from other matrices, symmetries, and non-uniform residue quantization.

An article by G. Korodi and D. He, entitled "QuYK: A Universal, Lossless Compression Method for Quantization Matrices," JCTVC-E435, JCT-VC 5th Meeting: Geneva, Mar. 16-23, 2011 (hereinafter [JCTVC-E435]), proposed two methods, one with advanced entropy coding, and another with symmetries, per-diagonal affine or quadratic prediction, and zero-tree coding of residual.

An article by E. Maani, M. Hague, A. Tabatabai, entitled "Parameterization of Default Quantization Matrices," JCTVC-G352, JCT-VC 7th Meeting: Geneva, C H, Nov. 21-30, 2011 (hereinafter [JCTVC-G352]), proposed a quadratic model.

An article by Y. Wang, J. Zheng, X. Zheng, Yun He, entitled "Layered quantization matrices compression," JCTVC-G530, JCT-VC 7th Meeting: Geneva, Nov. 21-30, 2011 (hereinafter [JCTVC-G530]), proposed a coding method with a hierarchical iterative refinement.

An article by R. Joshi, J. S. Rojals, M. Karczewicz, entitled "Compression and signaling of quantizer matrices," JCTVC-G578, JCT-VC 7th Meeting: Geneva, C H, Nov. 21-30, 2011 (hereinafter [JCTVC-G578]), proposed a raster scan coding mode (instead of diagonal) with modified differential coding, on top of symmetry rules.

An article by M. Hague, E. Maani, A. Tabatabai, entitled "High-level Syntaxes for the Scaling List Matrices Parameters and Parametric coding," JCTVC-H0460, JCT-VC 8th Meeting: San José, Calif., USA, Feb. 1-10, 2012 (hereinafter [JCTVC-H0460]), proposed a prediction using 3 parametric models (quadratic or HVS).

An article by S. Jeong, Hendry, B. Jeon, J. Kim, entitled "HVS-based Generalized Quantization Matrices," JCTVC-I0518, JCT-VC 9th Meeting: Geneva, C H, Apr. 27 — May 7, 2012 (hereinafter [JCTVC-I0518]) proposed an HVS-based model with a single parameter.

An article by R. Joshi, J. S. Rojals, M. Karczewicz, entitled "Quantization matrix entries as QP offsets," JCTVC-I0284, JCT-VC 9th Meeting: Geneva, C H, Apr. 27 — May 7, 2012 (hereinafter [JCTVC-I0284]), suggested the use of quantization matrices as QP offsets.

Figures 9, 11A, 11B:
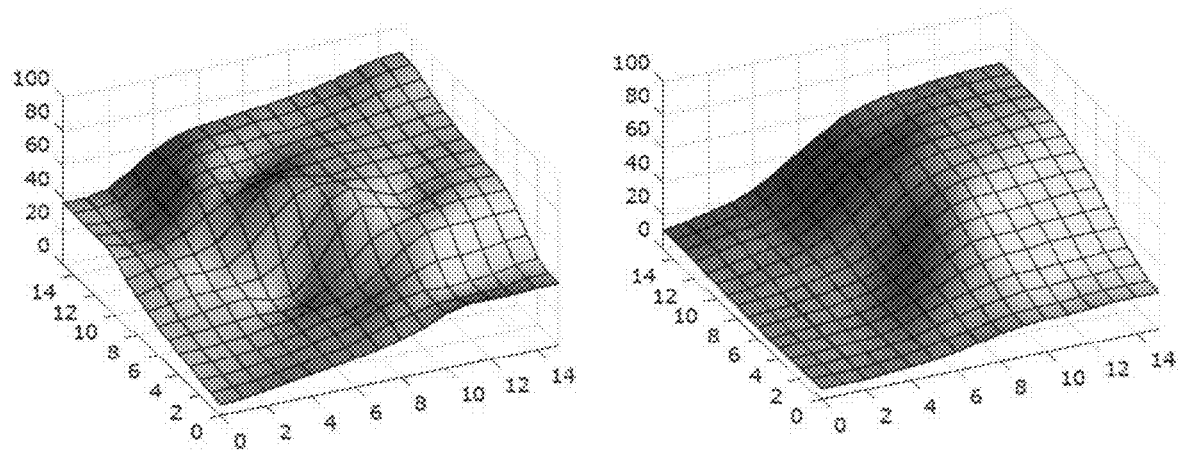
FIG. 9 illustrates two complex-shaped matrices.
FIG. 11A illustrates example matrix layers for an 8×8 size.
FIG. 11B illustrates 4 regions.

Evidence of increase of quantization matrix coding cost has been shown in [JCTVC-E056]. This has encouraged the development of techniques for more efficient coding of quantization matrices. An article by J. Tanaka, Y. Morigami, and T. Suzuki, entitled "Enhancement of quantization matrix coding for HEVC", JCT-VC 6th Meeting: Torino, IT, Jul. 14-22, 2011 (hereinafter [JCTVC-F475]), provided complex-shaped matrices, as shown in FIG. 9, to test the coding efficiency of the various proposals. The quantization matrices provided in FIG. 9 are both for 16×16, where the left one is symmetric and the right one is asymmetric. They are not meant to be meaningful, but designed for stress test: hard to encode, but not too much.

JCTVC-D0241 involves both x/y and central point symmetries, plus subsampled representation and linear interpolation reconstruction. Note that x/y symmetry means matrix symmetry, namely, M(x,y) =M(y,x). x/y symmetry is called "135 degree symmetry" in [JCTVC-D024]. Central point symmetry refers to "45 degree symmetry" in [JCTVC-D024], and mathematically, M(x,y)+M(N−1−y, N−1−x)=C, where N is the size of the (square) matrix, C is a constant, and x, y=0, 1, 2, . . . N−1. [JCTVC-D024] also proposed restriction to positive-only DPCM coding, but that was withdrawn afterwards.

Central-point symmetry is usually not relevant, and x/y symmetry is not always true. One benefit of the [JCTVC-D024] method comes from subsampled representation, that leads to about 2.5× reduction in bit cost with low error. However, since upsampling is not fully regular, it adds a little complexity to the specification.

JCTVC-E0731 offers several coding modes. At first, one mode involved affine prediction of horizontal, vertical, and diagonal axes, and linear interpolation for the rest; but that mode was abandoned in the $2^{nd}$ version ([JCTVC-F475]). The rest involves prediction from other matrices (with fixed tree and upscale), non-uniform residue quantization (quantization matrix for quantization matrix), x/y symmetry, and various scanning and coding options (raster DPCM, zigzag DPCM, or zigzag RLE), and VLC entropy coding. It suggested interpretation of quantization matrices as QP-offset in the first version.

In the [JCTVC-E073] method, the main reduction of bit cost comes from quantization, which creates moderate errors. However, there are many options, and the specification seems too complex for the purpose. The 3-axes affine model followed by linear interpolation is interesting, but probably not better than a single-stage polynomial model with the same number of parameters. Interpretation as a QP-offset has not been further discussed until [JCTVC-I0284] (see below).

JCTVC-E4351 proposed two methods: the first one is an advanced entropy coding with string substitution and arithmetic coding; the second one has three modes: an asymmetry mode where each up-right diagonal is predicted using a quadratic model with its own set of parameters, an x/y symmetry mode with an affine model instead of a quadratic one, and an x/y+central-point symmetry mode where only half of the diagonals are coded. Parameters for each diagonal are transmitted as indices to a finite set of coefficients, plus an offset. Residual is coded using a zero-tree.

For [JCTVC-E435], the first method is a new entropy coding method and seems too complex for the purpose. In the second method, modeling each diagonal with coarse-grained low-degree polynomial is interesting, but probably too complex compared to a global parametric model: diagonals are clearly correlated in real life. The test matrix (same as [JCTVC-D024]) is a bit too simple and biased towards half-diagonal zigzag scanning efficiency; it is not clear whether compression performance comes from per-diagonal affine model or zero-tree coding.

JCTVC-G3521 and [US20130188691] proposed a quadratic polynomial model for default matrices. Matrix coefficients are approximated by $$QM(x,y)=(a(x^2+y^2)+bxy+c(x+y)+d)/2^q$$

with x and y the position of the coefficient (from 0 to N-1 for an N×N matrix), (a, b, c, d) the parameters of the model as shown in Table 2, and q the bit precision which is typically 10. It is said that simple scaling of (a, b, c, d) would provide a straightforward extension for other matrix sizes: for a 2N×2N matrix, they are divided by (4, 4, 2, 1) respectively.

TABLE 2

Proposed parameters for AVC-type and HVS default matrices

| Type | Size | a | b | c | d |
|---|---|---|---|---|---|
| AVC intra | 8 × 8 | −56 | −127 | 3364 | 6898 |
| | 16 × 16 | −14 | −32 | 1682 | 6898 |
| | 32 × 32 | −4 | −8 | 841 | 6898 |
| HVS intra | 8 × 8 | 619 | 1277 | −4904 | 20249 |
| | 16 × 16 | 171 | 369 | −3039 | 23826 |
| | 32 × 32 | 45 | 99 | −1689 | 26059 |

Figure 10:
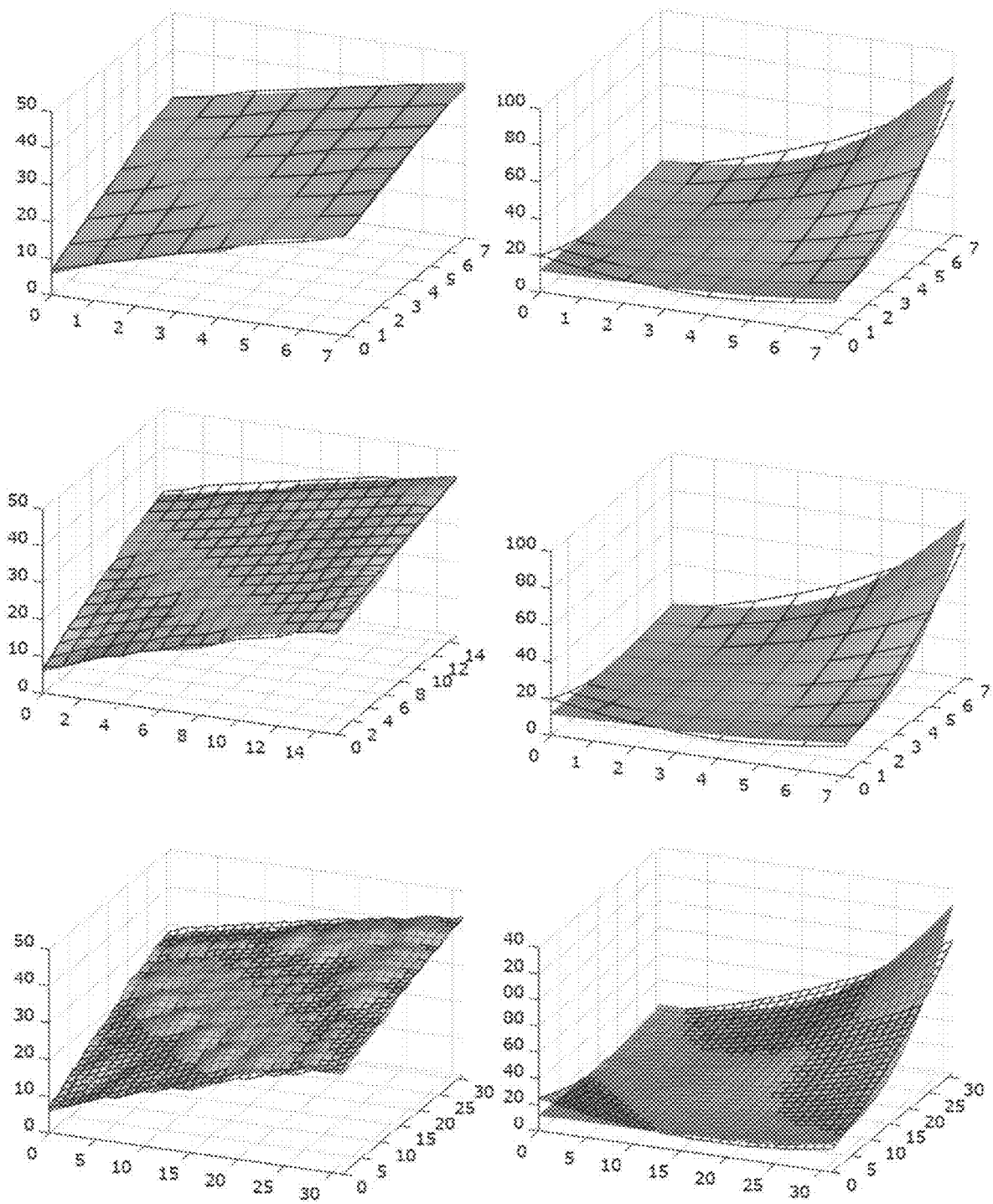
FIG. 10 illustrates the AVC-type (left) and HVS (right) matrices for size 8, 16 and 32.

This model provides a good fit for AVC-like matrices (easy since they nearly match a plane), but not so for HVS, and it is restricted to convex shapes. Also, dynamic range of parameters vary greatly with x or y exponent, especially for large sizes; this would lead to some accuracy problems with lower bit precision q. FIG. 10 illustrates the AVC-type (left) and HVS (right) matrices for size 8, 16 and 32, where the black grid shows the model and the gray surface shows the fitting target.

In [JCTVC-G352], reference is made to a work from Zhang et al. where a quadratic model is used internally by an encoder to optimize quantization matrices, with optimized matrices supposed to be transmitted in a traditional way (see, e.g., a patent application by H. Zhang et al., "Method and apparatus for modeling quantization matrices for image/video encoding", U.S. Pat. No. 8,326,068, hereinafter [U.S. Pat. No. 8,326,068]).

JCTVC-G5301 and an article by Y. Wang, J. Zheng, Yun He, entitled "Layered quantization matrices representation and compression," JCTVC-H0314, JCT-VC 8th Meeting: San José, Calif., USA, Feb. 1-10, 2012 (hereinafter [JCTVC-H314]), proposed a new method. It follows a hierarchical approach, where each position in the matrix is assigned a layer index (this assignment matrix is specific to each matrix size). FIG. 11A shows example matrix layers for an 8×8 size. First, the coefficients at root level positions are decoded, then coefficients of the next layer are predicted using linear interpolation and corrected with a residual; the process continues to the next layer, and so on. Residuals can be quantized with different scales for the 4 regions defined in [JCTVC-E073] (see FIG. 11B) and can be transmitted for a limited number of layers (e.g., only the first 2 layers), the remaining ones being zero. There is an x/y symmetric mode where only half the residuals are transmitted. Residuals are coded with DPCM or RLE depending on the layer. Instead of being coding explicitly as just described, matrices can also be copied from other ones from the same picture (using a fixed tree, from greater size to lowest, using regular subsampling), or coded differentially from the same matrix of the previous picture.

This method outperforms some other methods, with an interesting hierarchical approach, but is typically too complex for the purpose. Specifically, linear interpolation with unevenly spaced anchors is complex, with ratios that can be numbers like 1/3 or 3/7.

JCTVC-G5781 proposed a simple coding method on top of symmetry rules and subsampling: coefficients are scanned in raster order, each one is predicted with the maximum of upper and left neighbors, and corrected with a residual. Next one uses the corrected coefficient for prediction. Residuals are exp-golomb (EG) coded, with signed to unsigned mapping favoring positive value, since matrix coefficients are typically increasing. Residual transmission can be limited to a sub-block of the matrix (e.g., upper-left corner), the remaining one being inferred to O. The second version, as described in an article by R. Joshi, J. S. Rojals, M. Karczewicz, entitled "Coding of quantization matrices based on modified prediction and mapping to unsigned values," JCTVC-H0451, JCT-VC 8th Meeting: San José, Calif., USA, Feb. 1-10, 2012 (hereinafter [JCTVC-H0451]), added golomb-rice coding with variable order.

This method has good performance (about 40% less bits) in the asymmetric case, with very low complexity. However this might be biased by the test matrix, which is quasi monotonically increasing, thus well fit for max(left, top) prediction, and better than diagonal because of significant asymmetry. Note that 15 of the 40% comes from offset in signed to unsigned mapping, thanks to increasing matrix values. The gains are much lower for the symmetric case, and globally lower for smaller sizes than for big sizes.

JCTVC-H04601 proposed a parametric model-based coding method. First, a parametric model is selected among three possible ones:

TABLE 3

Parametric models proposed in [JCTVC-H0460]

| Type | Parameters | Definition |
| --- | --- | --- |
| Symmetric quadratic (same as [JCTVC-G352]) | 4 | $QM(x, y) = a(x^2 + y^2) + bxy + c(x + y) + d$ |
| Asymmetric quadratic | 6 | According to the document: $QM(x, y) = (a_1 x + b_1 y + c_1)(a_2 x + b_2 y + c_2)$ According to the code: $QM(x, y) = ax^2 + by^2 + cxy + dx + ey + f$ |
| HVS (like default matrix) | 4 | $H(x, y) = a(b + c \cdot f(x, y)) \cdot \exp(-(c \cdot f(x, y))^d)$ $QM(x, y) = \dfrac{16}{H(x, y)}$ with $f(x, y)$ the frequency function in [Chang] or Eq. (1) (not found in the test code) |

Then, optionally, a residual can be transmitted with a conventional method (e.g., zigzag scan and symmetry rule). Test results are given for parameters coded with EG5 and normalized to 32, and residuals. Matrix sizes greater than 8×8 are generated using an 8×8 representation followed by upsampling.

Figure 12:
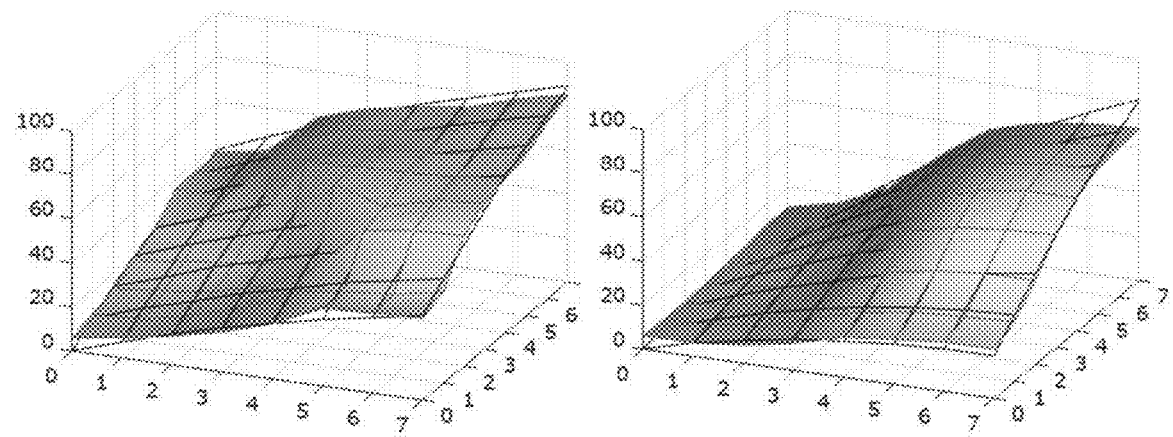
FIG. 12 illustrates fitting performance of [JCTVC-H0460] quadratic models for symmetric (left) or asymmetric (right) test intra matrices of size 8×8.

The plurality of parametric models and other options (like residual coding methods) makes the method complex. Moreover, the HVS model is computationally demanding. Results with residual do not show better performance than traditional method, but it is argued that if residuals are not needed (i.e., model is considered sufficient for the purpose), the representation is very compact. But the model is probably not sufficient since it is limited to $2^{nd}$-degree polynomials, and the HVS version does not provide more degrees of freedom. In FIG. 12, fitting performance of [JCTVC-H0460] quadratic models for symmetric (left) or asymmetric (right) test intra matrices of size 8×8 is shown, using SSE optimization and positive constraint, where the gray surface represents the target and the black grid the model. Results are in 38 and 56 bits (anchor is in 334 and 380).

JCTVC-I05181 proposed a generalized HVS model to transmit scaling matrices with a single α parameter:

$$QM(x, y) = \frac{16}{H(x, y)^\alpha}$$

Figure 13:
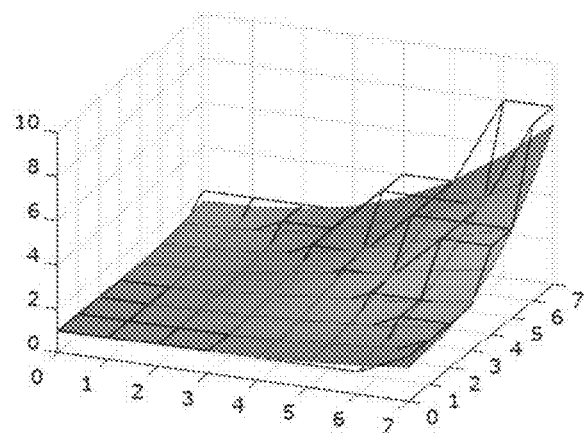
FIG. 13 illustrates an example of quantization matrix using approximation.

With H the same as in [Chang] or Eq. (2). A simplified computation is also proposed, using an approximation of 1/H as powers of two. An example using the approximation is shown in FIG. 13.

With only one parameter, this model is very compact, and the exponent probably makes it well fit for intra to inter conversion and temporal distance adaptation. However, the underlying formulas are quite complex and computationally intensive. The simplified computation technique introduces coarse approximation that may not be acceptable (e.g., the lower triangle half is fully flat). Moreover, restriction of quantization matrices to this class of matrices, with only one degree of freedom, is probably too severe.

JCTVC-I02841 suggested the use of quantization matrices as QP offsets (as already proposed in [JCTVC-E073]), explaining that it makes QP adjustment much more uniform in both directions, and also simplifies the dequantization process and potentially saves memory to in some implementations. It requires a local increase of QP granularity, by augmenting the resolution of levScale table in the dequantization process. Matrix would be coded in offset-binary (0-119 with 64 as mid-point).

During the standardization process, the JCT-VC group was very reluctant to increase the complexity of matrix coding, and memory storage was considered as critical as coding cost. Thus, matrix subsampling with repetition was chosen because it reached both goals without additional complexity and with minor quality impact, apart from that the design was kept mostly unchanged from AVC. Various attempts at non-uniform subsampling were rejected, because of increased complexity and unclear benefits. Using symmetry also increases complexity and was not considered worth the effort.

For large matrix sizes, sample repetition was preferred to linear interpolation because the dequantization process can then use the reduced-size representation without needing any on-the-fly computation. It is noted that subjective tests conducted during JCT-VC meeting H suggested that small errors in matrix coefficients had no visual impact, as described in a break-out group report on quantization matrices subjective viewing by T. Suzuki, K. Sato, X. Zhang, R. Joshi, J. Zheng, M. Zhou, entitled "Report on Quantization Matrices Subjective Viewing," JCTVC-H0730, JCT-VC 8th Meeting: San José, Calif., USA, Feb. 1-10, 2012 (hereinafter [JCTVC-H0730]).

Since small errors seem acceptable, and quantization matrix data is usually smooth, a parametric model would be a good fit. In fact, the data compression approach adopted to compare the different JCT-VC proposals may be misleading, since it is not focused on the real needs of quantization matrix designs. The idea of degrees of freedom may be a better match. Also, anticipated increase of the number of quantization matrices in the next standard pushes towards a more compact representation.

The emerging AV1 video coding standard also uses quantization matrices. Currently it makes use of a set of 16 possible matrix sets, hard-coded in both encoder and decoder. One matrix set comprises matrices for each block size, luma, and chroma. Like in HEVC, each matrix coefficient is used as a multiplicative factor of the quantization step for the matching coefficient of the transformed block.

Figure 14:
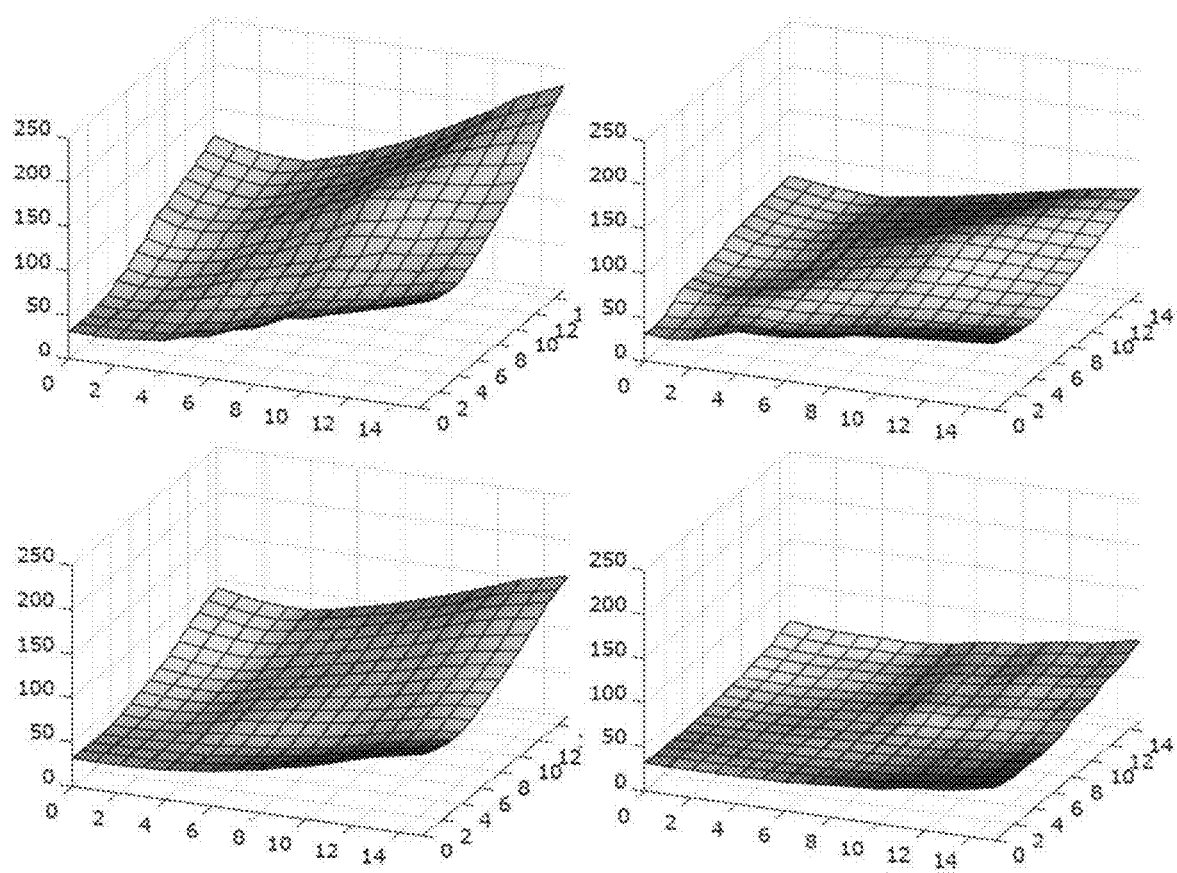
FIG. 14 illustrates 16×16 AV1 quantization matrices.

An index specifying which set out of 16 to use can be signaled by the encoder at picture level or 64×64 block level, and separately for each color component. This index is called "QM level" by AV1. FIG. 14 shows 16×16 AV1 quantization matrices, for luma and chroma index 0 at the top row, and for luma index 4 and 8 at the bottom row.

According to the hard-coded tables, increasing levels lead to flatter and flatter matrices. Matrices for index 15 are fully flat (with normalization value=32). Actually, a decoder interprets index 15 as "bypass" and skips matrix in the dequantization process in that case.

Here, the problem of transmitting many matrices is completely avoided by relying on hard-coded matrices. Flexibility is provided by choosing between 16 possibilities, but this is quite limited: this can be compared to varying the c factor in the HVS model of [JCTVC-H0460], or the alpha exponent in [JCTVC-I0518]. However, compared to HEVC, flexibility is improved by the ability to select the matrix at the block level.

On the other hand, hard-coded matrices take up much space in read-only memory, code, and specification. In particular, currently there are 107008 8-bit values in 6767 lines of code for decoder matrices, and as many for the encoder.

The present application proposes a compact representation of quantization matrices using a simple fixed polynomial model, with monomials sorted by increasing complexity, and a variable number of parameters, so that trading more bits for better accuracy reduces to code more or fewer parameters. In the following, some advantages of the proposed techniques are provided in comparison with other known works.

clear from the results of subjective viewing in JCT-VC meeting H where no difference could be detected between lossy and lossless QM transmission techniques, and the final decision to represent big matrices with an 8×8 resolution. Thus, a solution to encode the quantization matrix can be defining the global shape with "enough" freedom.

In one embodiment, a polynomial model is proposed, because among possible parametric surface models, polynomials probably offer the highest flexibility for the lowest complexity.

Figure 15:
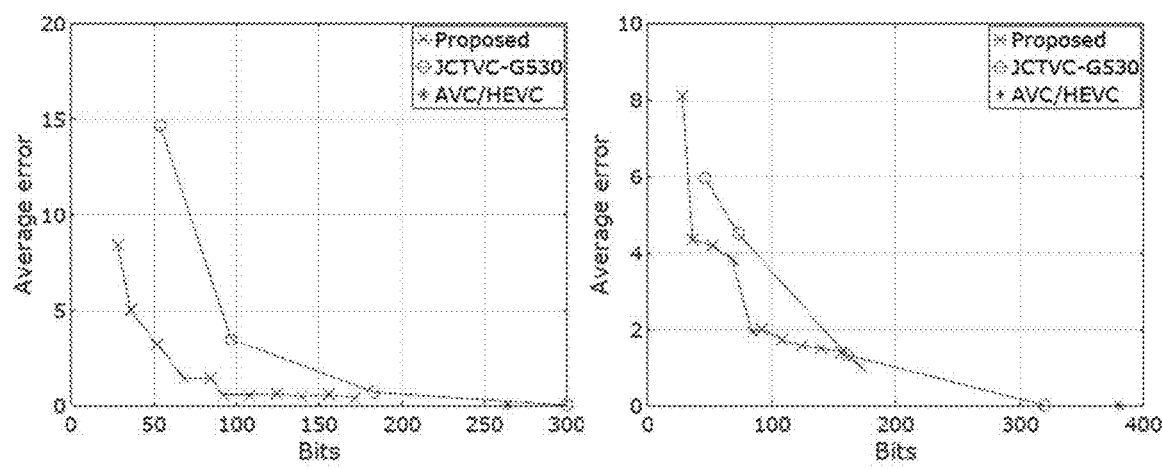
FIG. 15 illustrates the quantization matrix coding performance.

Note that even if the proposed representation is block-size independent, it is compatible with an expansion limited to 8×8 maximum, with repetition for higher sizes, like in HEVC. FIG. 15 illustrates the quantization matrix coding performance, where the simplest variant of the model proposed here (using 3, 4, 6, 8, 10, 11, 13, 15, 17, 19, or 21 parameters) is compared to the layered method proposed by [JCTVC-G530] (best "lossy" method proposed for HEVC), with AVC/HEVC coding method as a reference, for some 8×8 matrices (comparable results are obtained for other matrices). The proposed model generally extends and outperforms [JCTVC-G530] on the low-bitrate side.

Figure 16:
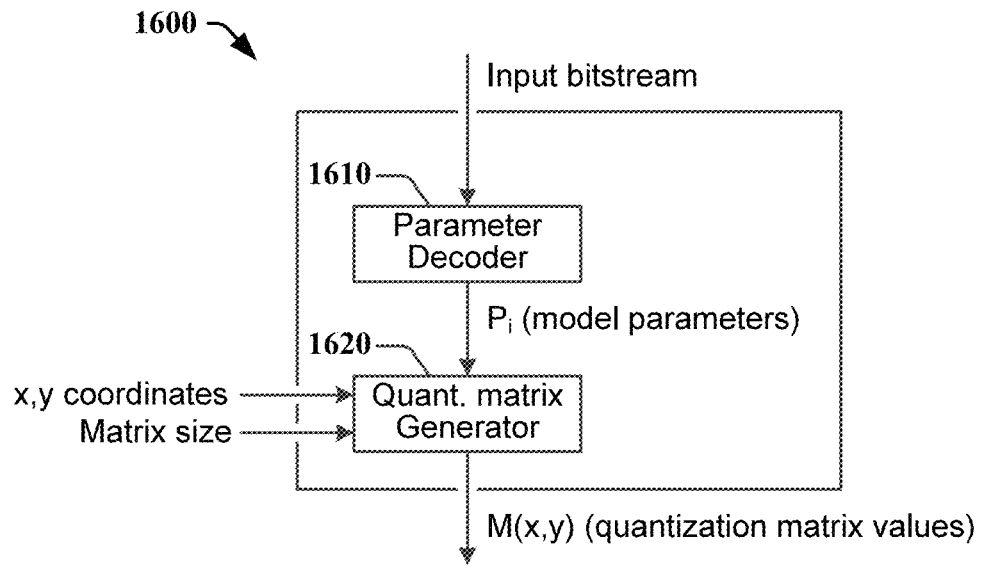
FIG. 16 illustrates a system for decoding the quantization matrix, according to an embodiment.

FIG. 16 illustrates system 1600 for decoding the quantization matrix, according to an embodiment. From the input bitstream, parameter decoder 1610 obtains model parameters, e.g., polynomial coefficients {Pi}, for the current quantization matrix. Then quantization matrix generator 1620 generates the current quantization matrix based on the matrix size and the model parameters.

Figure 17:
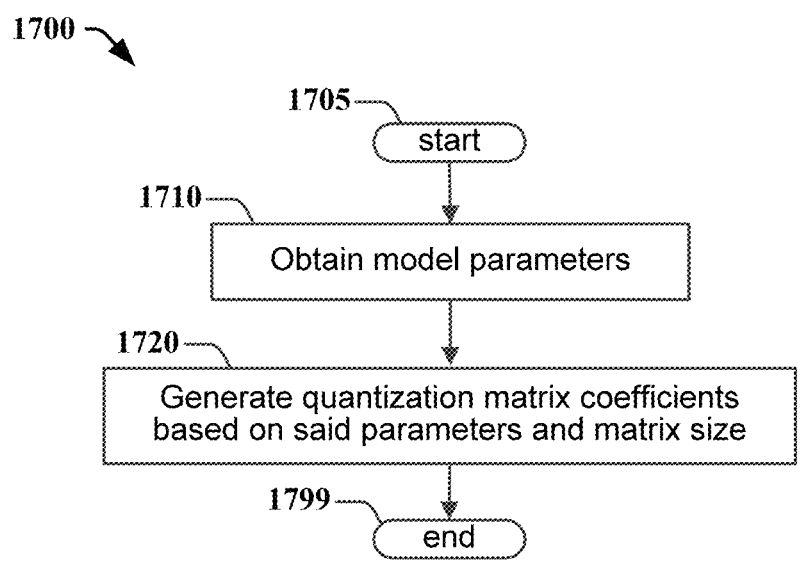
FIG. 17 illustrates a method for decoding the quantization matrix, according to an embodiment.

FIG. 17 illustrates method 1700 for decoding the quantization matrix, according to an embodiment. Method 1700 starts at step 1705. From the input bitstream, the decoder 1710 obtains model parameters, e.g., polynomial coefficients {Pi}, for the current quantization matrix. Then the

| Advantages | Prior art |
|---|---|
| A single fixed model, leading to simple implementation | Some fixed models were proposed, but either too restrictive or too complex |
| Variable number of parameters, directly driving coding cost, accuracy and complexity | Parametric models with fixed number of parameters. Monomials ordered by decreasing complexity. |
| Very compact representation (typically 10x less bits than traditional approach for 8 × 8 matrix), saving bits in a video bitstream, and allowing a higher variety of quantization matrices, thus improving psychovisual adaptation | Parametric models with comparable bit savings |
| High flexibility, allowing complex shapes | Parametric models with lacking flexibility, or layered method but less bit-efficient, or full specification with more bits. |
| Independent of block size | Block-size dependent |
| Interpretation as QP-offset can bring additional benefits | Some benefits can apply too |
| Computations can be performed on the fly in the dequantization process, minimizing memory needs | Applicable for simple parametric models (e.g., quadratic) |

The proposed technique can be used as direct matrix coding, or as a residual from a prediction, and either for default matrices or custom (transmitted) ones. In one embodiment, a residual using another coding method may be added to adjust QM coefficients further.

As described above, we anticipate a high pressure on bit cost of quantization matrices in the future video standard. In various embodiments, parametric models are used to offer a very compact representation, at the expense of some loss of freedom.

Since quantization matrices are usually very smooth, full control over each matrix coefficient is not required: this is decoder generates 1720 the current quantization matrix based on the matrix size and the model parameters. Method 1700 ends at step 1799. Method 1700 can be implemented in system 1600. In the following, the modeling of the quantization matrix will be described in further detail.

In one embodiment, the present technique uses a single fixed polynomial to represent a quantization matrix, to keep minimal complexity. Modulation of bit cost and complexity is achieved by specifying only the n first polynomial coefficients (also called "polynomial parameters"), the remaining ones being implicitly set to zero (or any relevant neutral values).

One form of the single fixed polynomial is a fully developed polynomial in (x,y), where x, y indicate the coordinates of a given coefficient in a quantization matrix, with monomials (also called "terms") ordered by increasing exponent, as shown in Eq. (3) expressing the way a quantization matrix coefficient M(x,y) is derived as a function of polynomial parameters $P_i$.

$$M(x, y) = \sum_i P_i \cdot m_i(x, y) \quad (3)$$

where $P_i$ are the polynomial coefficients, and $m_i(x,y) = x^{px_i} y^{py_i}$ are the terms, $px_i$ and $py_i$ being the exponents of x and y for monomial $m_i$.

This form provides high flexibility with reasonable complexity, controlled by the number of polynomial coefficients that are specified. Since higher exponents are the last ones, reducing the polynomial number of coefficients reduces de facto the degree of the polynomial, hence its complexity. Note that the exponent on a variable (i.e., x or y) in a term (i.e., $m_i(x,y)$) is called the degree of that variable in that term; the degree of the term is the sum of the degrees of the variables in that term, and the degree of a polynomial is the largest degree of any one term with non-zero coefficient.

More specifically, $M(x, y) = P_0 +$ (4)

$$P_1 x + P_2 y +$$
$$P_3 xy + P_4 x^2 + P_5 y^2 +$$
$$P_6 x^2 y + P_7 xy^2 + P_8 x^3 + P_9 y^3 +$$
$$P_{10} x^2 y^2 + P_{11} x^3 y + P_{12} xy^3 + P_{13} x^4 + P_{14} y^4 +$$
$$\ldots$$

Here monomials are sorted by:

Rule 1. Increasing degree of the term;

Rule 2. Increasing maximal (x or y) exponent; and

Rule 3. Increasing y exponent.

In Eq. (4), different subsets of polynomial coefficients define M(x,y) at different degrees. For example, line 1 ("$P_0$") defines a degree-0 polynomial (i.e., constant), lines 1 and 2 ("$P_0 + P_1 x + P_2 y$") define a degree-1 polynomial, lines 1-3 ($P_0 + P_1 x + P_2 y + P_3 xy + P_4 x^2 + P_5 y^2$) define a degree-2 polynomial (like JCTVC-H0460), etc. Each line adds the terms for the next degree. Note that the maximal number of coefficients for degrees 0, 1, 2, 3, 4, 5, are respectively 1, 3, 6, 10, 15, and 21.

The series can be continued, but we suggest stopping at degree 4 (i.e., 15 parameters, $P_0$-$P_{14}$), because higher degrees need more and more parameters, with increasing complexity and challenging dynamic range for intermediate computations.

Note that the polynomial may take different forms. For example, rule 2 can be ignored, or rule 3 can be modified to follow increasing x exponent. While different forms of M (x,y) can be used, the encoder and decoder should both have the knowledge of the ordered sequence of the monomials $m_i(x,y)$, i=0, 1, 2 . . . Subsequently, when the polynomial parameters are transmitted or received, the i-th polynomial coefficient $P_i$ corresponds to the i-th monomial $m_i(x,y)$, and thus the polynomial can be constructed, by associating the polynomial coefficient and the monomial at the same index (i.e., pairing $P_i$ and $m_i(x,y)$), as $M(x,y) = \Sigma_i P_i \cdot m_i(x,y)$.

Here, by using a well-defined transmission (or storage) order of polynomial parameters, the complexity of the quantization matrix can be controlled easily through the number of polynomial parameters used to represent the quantization matrix. In one example, the number of polynomial parameters is transmitted, explicitly or implicitly, in the bitstream as part of the syntax.

Default polynomial coefficients can be used, or the polynomial coefficients can be transmitted in the bitstream. In one example, a limited number of polynomial parameters can be specified, and the remaining ones can be inferred to be zero. Transmitting fewer parameters typically needs fewer bits, and a simpler shape that is easy to compute, and more parameters mean more bits, and more complex shape that is harder to compute.

With a degree-4, the number of polynomial parameters can go from 0 to 15, which can be coded with 4 bits if it needs to be transmitted. 0 can be interpreted as default matrix (or to default parameters).

In one embodiment, a symmetry flag, e.g., sym, can be added to specify the same coefficient for monomials that are symmetrical in x and y, thus forming a symmetric polynomial, with a reduced number of parameters (e.g., 9 instead of 15 for degree 4). The mapping is shown in Table 4 for degree-4.

TABLE 4

| Mapping of symmetrical polynomial parameters | | | | | | | | | | | | | | | |
|---|---|---|---|---|---|---|---|---|---|---|---|---|---|---|---|
| | 1 | x | y | xy | $x^2$ | $y^2$ | $x^2 y$ | $xy^2$ | $x^3$ | $y^3$ | $x^2 y^2$ | $x^3 y$ | $xy^3$ | $x^4$ | $y^4$ |
| sym = 0 | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ |
| sym = 1 | $P'_0$ | $P'_1$ | $P'_1$ | $P'_2$ | $P'_3$ | $P'_3$ | $P'_4$ | $P'_4$ | $P'_5$ | $P'_5$ | $P'_6$ | $P'_7$ | $P'_7$ | $P'_8$ | $P'_8$ |

Normalization of x and y

In one embodiment, we propose to normalize the x and y variables, which was not done in previous work like [JCTVC-G352] or [JCTVC-H0460], to:

1—Equalize dynamic range between the various polynomial coefficients. In Table 2, taken from previous work, coefficients a and d have very different range, which can lead to severe problems if increasing polynomial degree and/or matrix size. With normalization, this problem is solved, and polynomial coefficients can be transmitted with a fixed number of bits. This is simpler, and has proven more efficient in our tests than exp-Golomb coding of parameters without x and y normalization, for the same accuracy on the resulting matrix.

2—Use the same polynomial coefficients for different matrix sizes, including rectangular ones. With this method, using the same polynomial for a half-size matrix is exactly equivalent to take every other coefficient of the full-size one; this works in x direction, y, or both.

Let us define a normalization value N, so that $$x = N \frac{x'}{size_x}, \; y = N \frac{y'}{size_y} \quad (5)$$

with x',y' integers in the interval [0 ... $size_{x/y}$−1] (i. e., the indices of the columns and rows of the matrix), where $size_x$ and $size_y$ are horizontal and vertical size of the matrix.

Figure 18:
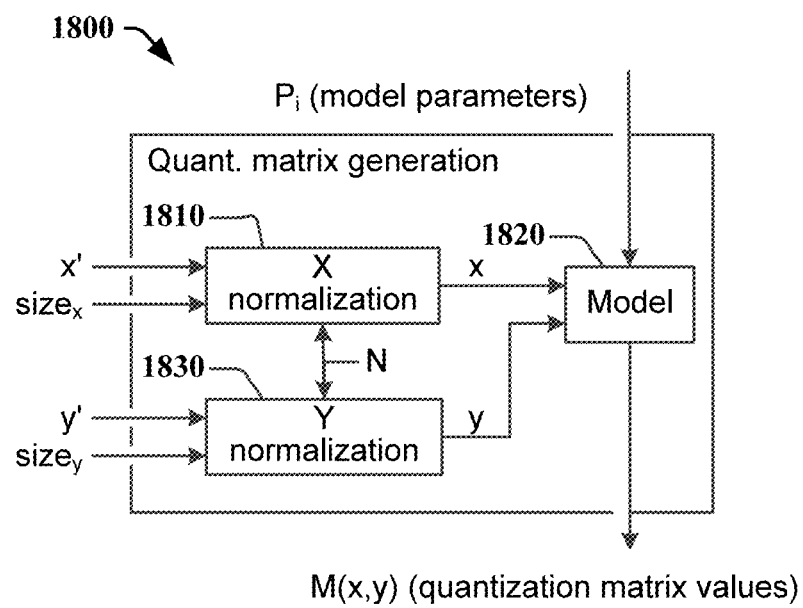
FIG. 18 illustrates a method for normalizing the matrix coordinates, according to an embodiment.

FIG. 18 illustrates method 1800 for normalizing the matrix coordinates, according to an embodiment. Method 1800 can be implemented in quantization matrix generate 1620, or can be used for performing step 1720.

Specifically, for the matrix coordinate x', based on the horizontal size of the quantization matrix and the normalization value N, x normalization (1810) can be performed:

$$x = N \frac{x'}{size_x}.$$

similarly, for the matrix coordinate y', based on the vertical size of the quantization matrix and the normalization value N, y normalization (1830) can be performed:

$$y = N \frac{y'}{size_y}.$$

Then the normalized matrix coordinates x and y can be used in modelling (1820) the quantization matrix, for example, used in Eq. (4) to generate M(x,y).

An obvious choice for N is 1, since this makes every monomial in the [0 ... 1) range, so the maximal impact of the variation (accuracy) of each coefficient is the same. This is an important consideration when trying to define the number of significant bits needed. However, the dynamic range of polynomial coefficients to match a given shape varies a lot, depending on the number of polynomial coefficients, and on the rank (index i in $P_i$) of each coefficient. ($y^{th}$ and $1^{st}$ degree polynomial coefficients tend to be smaller than others, and a higher number of polynomial coefficients yield bigger dynamic range for all of them.

Figure 19:
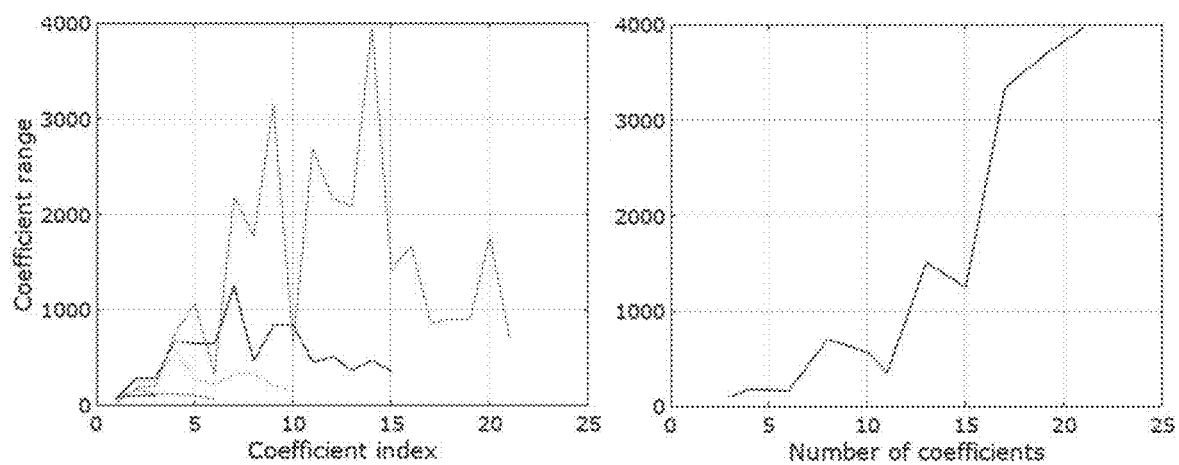
FIG. 19 illustrates the dynamic range of coefficients.

Unconstrained least squares fitting has been performed, for example, by minimizing mean squared error between reconstructed matrix and test matrix, on a test set based on H.264, HEVC, and other test 8×8 matrices. In FIG. 19, the left figure shows the maximum absolute value of each coefficient, for several experiments with 6, 10, 15, 21 polynomial coefficients; the right figure shows the maximum absolute value among all polynomial coefficients, for different numbers of coefficients (3 to 21).

Theoretically, polynomial coefficients could be transmitted with unlimited range, using exp-golomb coding. But large polynomial coefficients would be unrealistic for use in matrix computation, which shall be fully specified, thus bit-limited. This implies defining the range of polynomial coefficients and their accuracy.

Since quantization matrices are typically defined as 8-bit numbers, it makes sense to define polynomial coefficients with a similar bit depth. If the number of polynomial coefficients is limited to 15 (i.e., degree 4), they could be constrained to [−512 ... 511] range (i.e., 10-bit signed), and dropping 2 LSBs (Least Significant Bits) would make them 8-bit signed. This would reduce accuracy of matrix (0,0) value by a factor 4, but overall accuracy can be satisfying because each coefficient affects matrix at different places with various levels.

Figure 20:
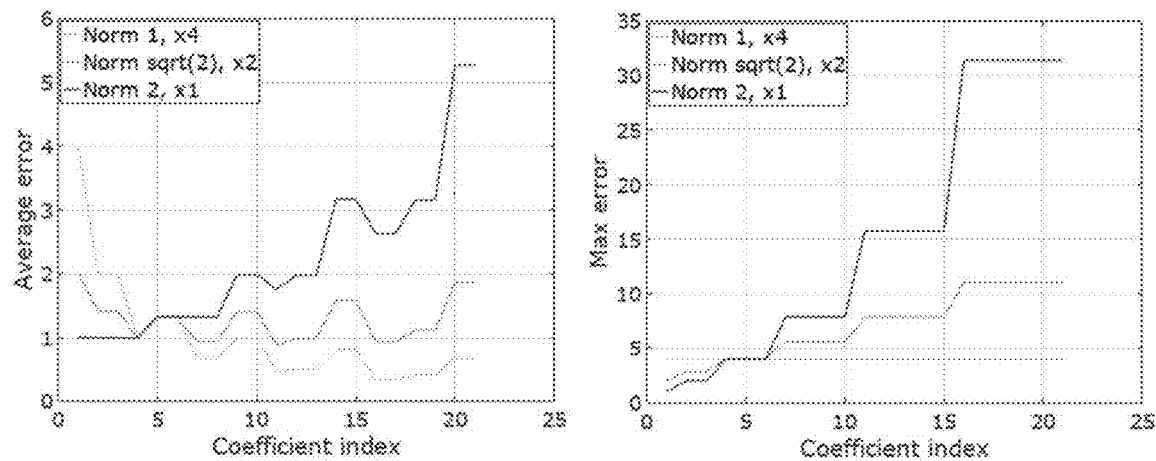
FIG. 20 illustrates the impact of coefficient accuracy on fit quality.
Figure 21:
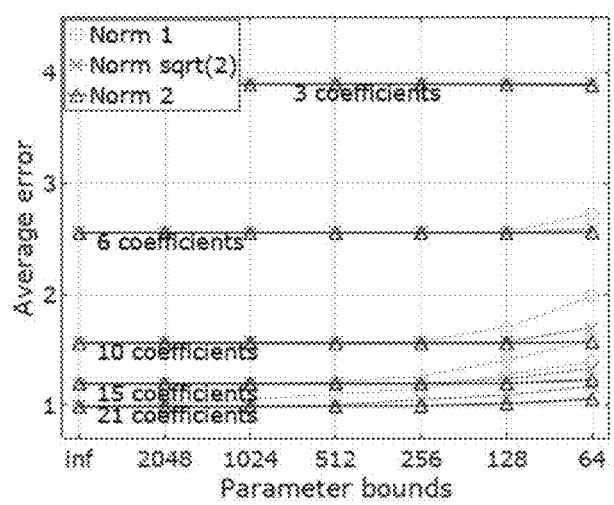
FIG. 21 illustrates the impact of coefficient bounds on fit quality.

Normalization value N=1 is not the only possible choice, and other values yield other compromises on coefficient range and accuracy: for N>1, accuracy of higher-index coefficients have greater impact, as shown on FIG. 20. Impact of coefficient bounds (i.e., dynamic range) on fitting quality for various N is shown on FIG. 21, suggesting 512, 256, and 128 for N=1, $\sqrt{2}$, 2.

A recommended N is 2, because it yields stable low coefficient range with a good compromise on overall accuracy, and keeps full accuracy for (0,0) matrix position, which is valuable.

Efficient Computation

Since $size_x$ and $size_y$ are typically powers of 2, and if N is also a power of two (we recommend N=2), the division in Eq. (5) will simplify to bit shifts. Let sx=log2 ($size_x$)−log2 (N) and sy=log2 ($size_y$)−log2 (N), then equation (5) can be written as:

$$x = \frac{x'}{2^{sx}}, \; y = \frac{y'}{2^{sy}} \quad (6)$$

Reported in Eq. (3), this becomes:

$$M(x', y') = \sum_i P_i \left(\frac{x'}{2^{sx}}\right)^{px_i} \left(\frac{y'}{2^{sy}}\right)^{py_i} = \sum_i P_i \frac{x'^{px_i} y'^{py_i}}{2^{sx.px_i+sy.py_i}} \quad (7)$$

Now if defining smax=max(sx. px+sy. py), we can write $$M(x', y') = \frac{\sum_i P_i x'^{px_i} y'^{py_i} \cdot 2^{smax-sx.px_i-sy.py_i}}{2^{smax}} \quad (8)$$

With $m'_i(x',y')=x'^{px_i}y'^{py_i}$, $$M(x', y') = \frac{\sum_i P_i m'_i(x', y') \cdot 2^{smax-sx.px_i-sy.py_i}}{2^{smax}} \quad (9)$$

Since smax≥0 and smax−sx. $px_i$−sy. $py_i$≥0, the multiplication by $2^{smax-sx. px_i-sy. py_i}$ simplifies to left shifting, and the final division by $2^{smax}$ can be implemented with a right shift, preferably with rounding:

$$M(x', y') = \left(\left(\sum_i P_i m'_i(x', y') \ll s_i\right) + rnd\right) \gg smax \quad (10)$$

with $s_i$=smax−(sx. $px_i$+sy. $py_i$) and rnd=1<<(smax−1).

Figure 22:
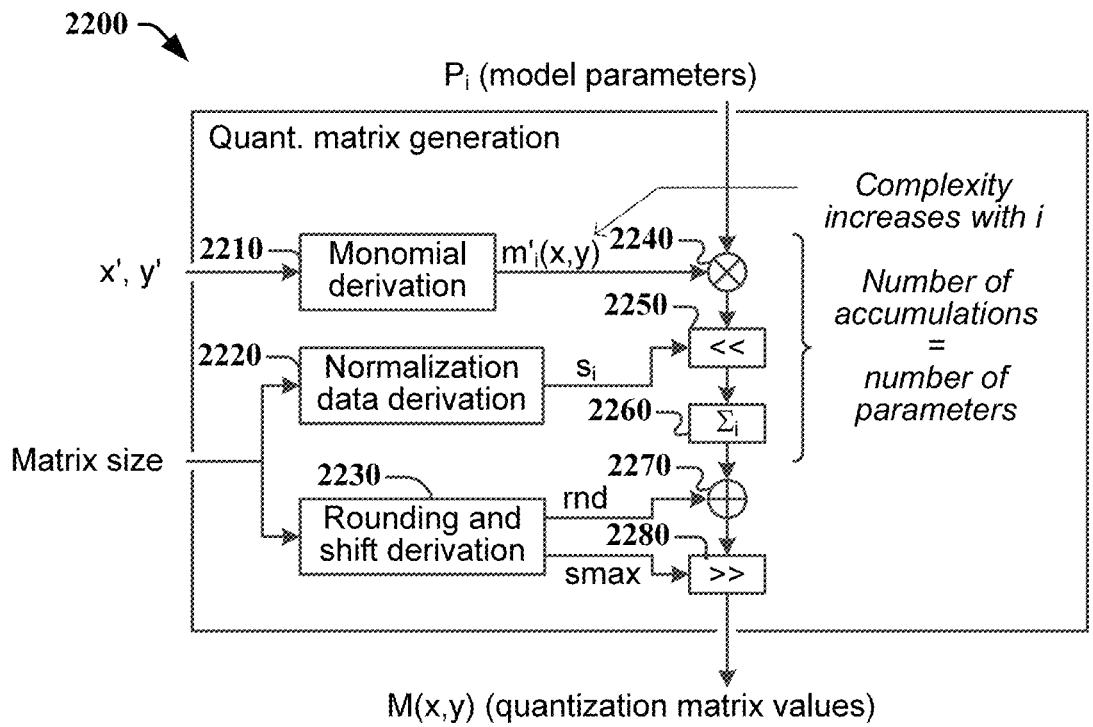
FIG. 22 illustrates a quantization matrix generator with integer computing, according to an embodiment.

This method retains good accuracy, with integer computations. FIG. 22 illustrates quantization matrix generator 2200 with integer computing, according to an embodiment. Generator 2200 can be used as module 1620.

From the matrix size ($size_x$, $size_y$) and the normalization value N, $sx=\log2(size_x)-\log2(N)$ and $sy=\log2(size_y)-\log2(N)$, and the normalization data can be derived (2220): $s_i=smax-(sx.\ px_i+sy.\ py_i)$. The rounding and shifting value can be derived (2230) as: $smax=\max(sx.\ px+sy.\ py)$, and $rnd=1<<(smax-1)$.

From quantization matrix coordinate x' and y', the i-th monomial can be derived (2210) as: $m'_i(x',y')=x'^{px_i}y'^{py_i}$. Pairing (2240) the i-th monomial with the i-th polynomial parameter $P_i$, $P_i m'_i(x',y')$ is formed (2240). Then left shifting is applied (2250): $P_i m'_i(x',y')<<s_i$, and the shifted results are summed (2260) up: $\Sigma_i P_i m'_i(x',y')<<s_i$, rounded by adding (rnd) (2270) and right shifted (2280) by smax to form the elements in the quantization matrix: $M(x',y')=((\Sigma_i P_i m'_i(x',y')<<s_i)+rnd)>>smax$.

Figure 23:
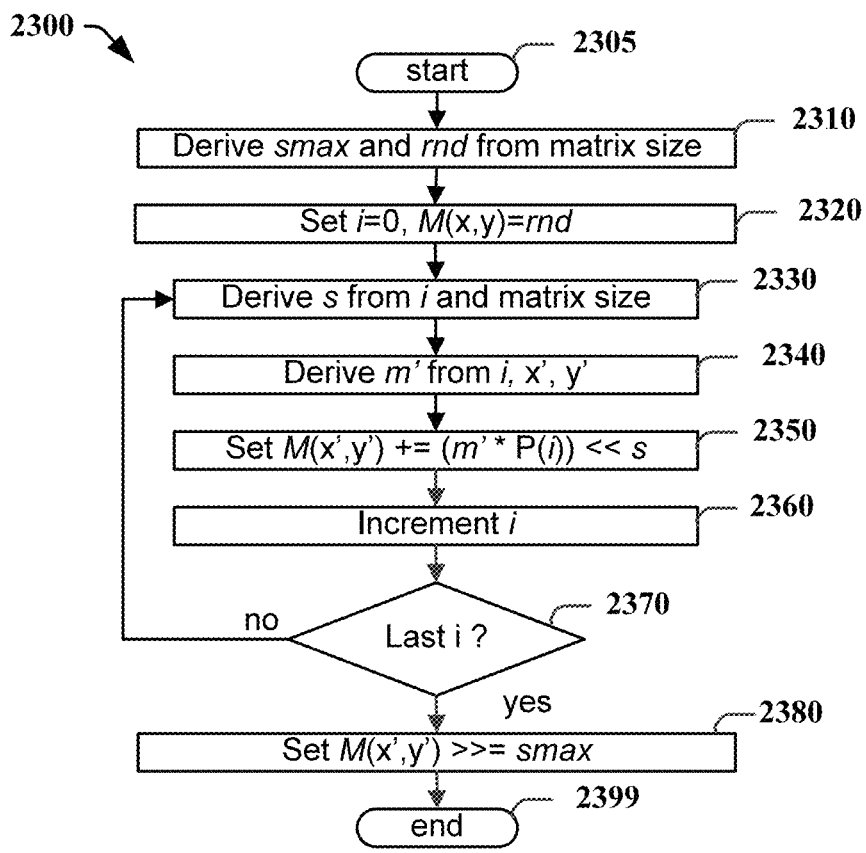
FIG. 23 illustrates a method for generating a quantization matrix with integer computing, according to an embodiment.

FIG. 23 illustrates method 2300 for generating the quantization matrix with integer computing, according to an embodiment. Generator 2300 can be used as in module 1620 or be performed in step 1720.

Method 2300 starts at step 2305. From the matrix size ($size_x$, $size_y$) and the normalization value N, $sx=\log2(size_x)-\log2(N)$ and $sy=\log2(size_y)-\log2(N)$, the rounding and shifting value can be derived (2310) as: $smax=\max(sx.\ px+sy.\ py)$, and $rnd=1<<(smax-1)$.

The decoder then initializes (2320) variable i to 0, and $M(x',y')=rnd$. At step 2330, the normalization data can be derived: $s_i=smax-(sx.\ px_i+sy.\ py_i)$. From quantization matrix coordinate x' and y', the i-th monomial can be derived (2340) as: $m'_i(x',y')=x'^{px_i}y'^{py_i}$. Pairing (2350) the i-th monomial with the i-th polynomial parameter $P_i$, $P_i m'_i(x',y')$ is formed, and added to M(x,y) after left shifting (2350): $M(x',y')+=P_i m'_i(x',y')<<s_i$. At step 2360, variable i is incremented by 1. At step 2370, the decoder checks whether the last monomial has been processed. If not, the control returns to step 2330. Otherwise, at step 2380, M(x',y') is right shifted by smax to form the elements in the quantization matrix: $M(x',y')>>=smax$. Method 2300 ends at step 2399.

Most variables can be pre-computed, since rnd and smax only depend on matrix size, $s_i$ depend on matrix size and monomial index. Table 5 shows an example:

TABLE 5

Example computation of $s_i$, rnd, smax

| $m_i$ | 1 | x | y | xy | $x^2$ | $y^2$ | $x^2y$ | $xy^2$ | $x^3$ | $y^3$ | $x^2y^2$ | $x^3y$ | $xy^3$ | $x^4$ | $y^4$ |
|---|---|---|---|---|---|---|---|---|---|---|---|---|---|---|---|
| $px_i$ | 0 | 1 | 0 | 1 | 2 | 0 | 2 | 1 | 3 | 0 | 2 | 3 | 1 | 4 | 0 |
| $py_i$ | 0 | 0 | 1 | 1 | 0 | 2 | 1 | 2 | 0 | 3 | 2 | 1 | 3 | 0 | 4 |

| For an 8 × 8 matrix and N = 2: sx = 2, sy = 2, smax = 8, and rnd = 128 | | | | | | | | | | | | | | | |
|---|---|---|---|---|---|---|---|---|---|---|---|---|---|---|---|
| $sx \cdot px_i + sy \cdot py_i$ | 0 | 2 | 2 | 4 | 4 | 4 | 6 | 6 | 6 | 6 | 8 | 8 | 8 | 8 | 8 |
| $s_i$ | 8 | 6 | 6 | 4 | 4 | 4 | 2 | 2 | 2 | 2 | 0 | 0 | 0 | 0 | 0 |

It can be noted that $m'_i$ do not depend on matrix size, hence they can be computed once lit for all, with a subpart used for smaller sizes. Efficient incremental implementations are possible, with very few multiplications.

Alternatively, shifting by $s_i$ can be applied to $P_i$ before the computation of the matrix, so that the latter is a series of multiply-accumulate, initialized by rnd, and followed by a right shift, which is a very commonplace operation.

Analysis of Intermediate Computation Bit Depth

For the example above (8×8 matrix with N=2), with 8-bit signed $P_i$, Table 6 shows the bit depth of $m'_i$, $P_i m'_i$ and $P_i m'_i <<s_i$.

TABLE 6

| i | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $m'_i$ bitdepth | 0 | 3 | 3 | 6 | 6 | 6 | 9 | 9 | 9 | 9 | 12 | 12 | 12 | 12 | 12 |
| $P_i m'_i \rightarrow$ | 8 | 11 | 11 | 14 | 14 | 14 | 17 | 17 | 17 | 17 | 20 | 20 | 20 | 20 | 20 |
| $P_i m'_i << S_i \rightarrow$ | 16 | 17 | 17 | 18 | 18 | 18 | 19 | 19 | 19 | 19 | 20 | 20 | 20 | 20 | 20 |

However, we expect a result with mbd (matrix bit depth)=8 bits (unsigned) for the matrix values, after shifting right by smax=8 bits. $P_i$ shall be constrained at design time so that the result is positive and within bounds (0-255). Furthermore, truncation (of upper bits) after shifting (mbd=8 bits), or before (mbd+smax=16 bits), is equivalent. Also, for an addition, truncating operands make no difference if the result is truncated to the same bit depth, and two's complement representation of signed values makes this applicable to both signed and unsigned numbers.

This means that the accumulator of $P_i m'_i << s_i$ can be limited to (mbd+smax)=16 bits. However, multipliers cannot be reduced (but their result can be truncated to the working bit depth). In the 8×8 example, they must have 12 and 8-bit inputs and 16-bit result; for a 256×256 matrix, they should have 32 and 8-bit inputs, and 36-bit result.

The final right shift could be adjusted, to give some flexibility on the range and accuracy of $P_i$. Eq. (10) is then modified as follows:

$$M(x', y') = \left(\left(\sum_i P_i m'_i(x', y') << s_i\right) + rnd\right) >> (smax - s_{base}) \quad (11)$$

This is intended to be used with positive values, to improve accuracy of the parameters. to If negative values are used to increase dynamic range, it should be noted that this will have an impact on intermediate computation bit depth (for example, −1 will add 1 bit the accumulator bit depth).

Rounding value rnd should be adjusted accordingly: rnd=1<<(smax−$s_{base}$−1).

Lower clipping can be added on top of polynomial representation, as shown in Eq. (12) (this is also applicable on top of Eq. (10) or (11)). This can improve fitting to usual quantization matrices because they often have a flat area on the lower end.

$$M(x, y) = \max\left(\sum_i P_i m_i(x, y), \text{clip}\right) \quad (12)$$

Figure 24:
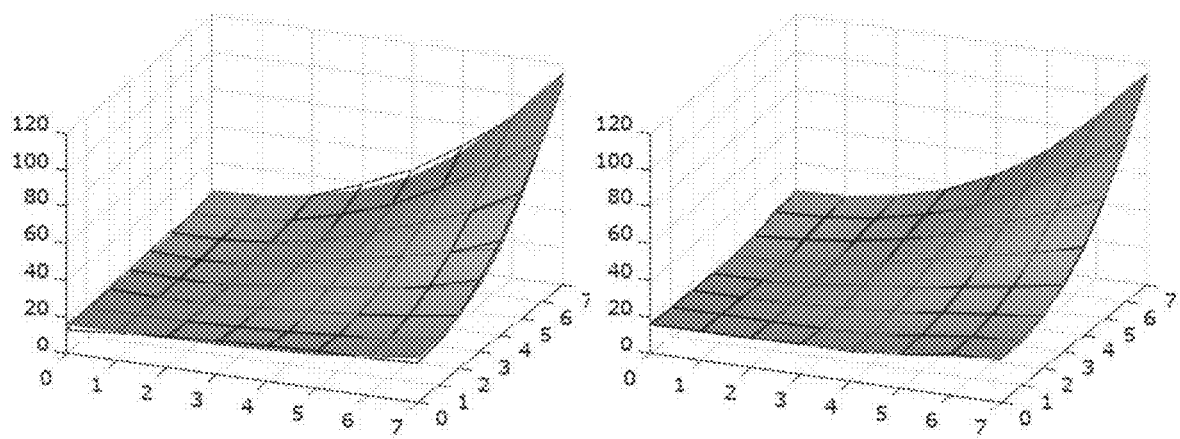
FIG. 24 illustrates the default HEVC intra matrix with 10-parameter fit.
Figure 25:
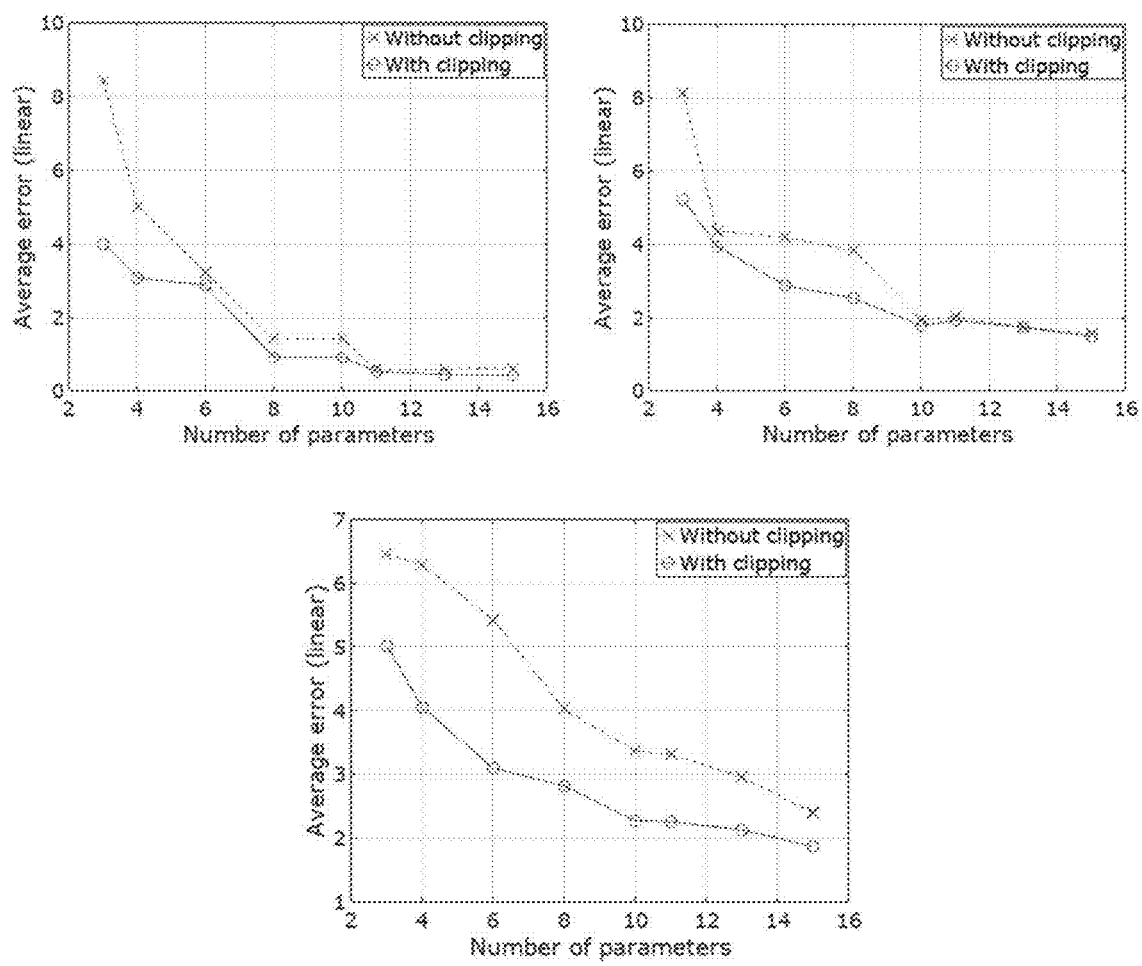
FIG. 25 illustrates the impact of clipping on fitting errors.

This has a significant impact on fitting quality, especially for small number of parameters, as illustrated in FIG. 24 and FIG. 25 (tested without symmetry flag nor custom shifting). In particular, the left figure in FIG. 24 shows the fitting for the default HEVC intra matrix using 10-parameters, without clipping, and the right figure is with clipping. The figures in FIG. 25 shows the impact of clipping on fitting error for the default HEVC intra 8×8 matrix (left), JCTVC-F475 8×8 asymmetric test matrix (middle), H.264 matrix (right).

It should be noted that discussions around polynomial result range are no more applicable on the lower side, because of clipping: polynomial is now unbounded below zero, since clipping will correct it. Either the polynomial coefficients should be constrained to give result within matrix range, or the result bit depth should be increased to accommodate for the bigger range, with relaxed constraint. The recommended option is to have 1 bit more, to allow negative polynomial (up to −256 for 8-bit matrix coefficients); clipping would make the result positive and drop the sign bit.

Current HEVC syntax is reproduced in the following (see HEVC standard version 3, April 2015):

| scaling_list_data( ) { | Descriptor |
|---|---|
| ... | |
|   nextCoef = 8 | |
|   coefNum = Min( 64, ( 1 << ( 4 + ( sizeId << 1 ) ) ) ) | |
|   if( sizeId > 1 ) { | |
|     scaling_list_dc_ minus8[ sizeId - 2 ][ matrixId ] | se(v) |
|     nextCoef = scaling_list_dc_coef_minus8[ sizeId − 2 ][ matrixId ] + 8 | |
|   } | |
|   for( i = 0; i < coefNum; i++) { | |
|     scaling_list_delta_coef | se(v) |
|     nextCoef = ( nextCoef + scaling_list_delta coef + 256 ) % 256 | |
|     ScalingList[ sizeId ][ matrixId ][ i ] = nextCoef | |
|   } | |
|   ... | |
| } | |

Based on the proposed model, this portion of syntax can be replaced for example by:

| scaling_list_data( ) { | Descriptor |
|---|---|
| ... | |
|   scaling_poly_nb_param | u(4) |
|   if( scaling_poly_nb_param > 0 ) { | |
|     scaling_poly_symmetric | f(1) |
|     scaling_poly_shift[ sizeId ][ matrixId ] | u(2) |
|     scaling_poly_clip[ sizeId ][ matrixId ] | f(4) |
|     for( i = 0; i < scaling_poly_nb_param; i++) { | |
|       scaling_poly_param[ i ] | i(8) |
|     } | |
|   } | |
|   ... | |
| } | | scaling_poly_nb_param=0 means "default parameters". In that case the following syntax elements are skipped. Otherwise, it defines the number of scaling_poly_param present to in the syntax. Please note that it may be taken from a list of predefined values. The number of parameters may also be indicated using a look-up table, for example, a table nb_param[i][sym] may be known at both the encoder and decoder, and index i of the table is signaled in the bitstream. In one example, the number of parameters is restricted to 1, 3, 4, 6, 8, 10, 11, 13, and 15.

scaling_poly_symmetric, if 1, indicates that scaling_poly_param should be repeated for x/y symmetric polynomial coefficients. This flag can be removed if this feature is not desired. If removed, it should be inferred to 0 in the following.

scaling_poly_shift selects $s_{base}$ from a set of predefined values. For example, $s_{base}$=scaling_poly_shift—offset, with offset selected in accordance to normalization. For N=2, we recommend 0 to 3 range, i.e., use $s_{base}$=scaling_poly_shift.

scaling_poly_clip defines the lower clipping value from a range of predefined values. It can take fewer bits than shown in the table, for example, it can use 2 or 3 instead of 4 bits. This could be [1, 4, 8, 16], for example. Please note that the lower clipping value typically is no greater than 16 (the neutral value for 8-bit matrix coefficients used as quantization scaling factors as in HEVC).

scaling_poly_param is used to represent the polynomial coefficients for the selected matrix (scaling_poly_coef, that matches $P_i$ in equations (3), (11), (12), and others).

The size, order, and format of syntax elements can be changed, and some of them can depend on scaling_poly_nb_param. For example, scaling_poly_symmetric is useless if scaling_poly_nb_param is 0 or 1, and the number of bits of scaling_poly_shift can increase with the number of parameters, etc. In addition, the syntax can vary, and polynomial coefficients could be derived in an indirect way.

In HEVC, the scaling list is signaled in SPS (Sequence Parameter Set) or PPS (Picture Parameter Set). It should be noted that the present embodiments are not limited to transmitting the quantization matrix information in SPS or PPS. For example, the quantization matrix information can be transmitted in a parameter set dedicated to transmitting matrices. In another example, the quantization matrix information can be transmitted at the block level, possibly with the number of parameters being variable.

The following algorithm can be used to duplicate symmetric elements on the fly when needed:

```
k = n = degree = 0;
for( i = 0; i < scaling_poly_nb_param; i++ ) {
   scaling_poly_coef[sizeId] [matrixId]
      [n++] = scaling_poly_param[i] ;
   if( scaling_poly_symmetric ) {
      k++;
      if( k > (degree+1) % 2 ) {
         scaling_poly_coef[sizeId] [matrixId]
            [n++] = scaling_poly_param[i] ;
         k++;
      }
      if( k > degree ) {
         degree ++;
         k = 0;
      }
   }
}
```

With this method, there is no need to save symmetric flag because all coefficients are derived on the fly. Note that this is a simple copy when scaling_poly_symmetric is zero.

Note that non-specified parameters should have no effect: either scaling_poly_coef should be initialized to zero, or n should be saved so that matrix computation can terminate early.

This algorithm can be written in tabular form as follows:

| scaling_list_data( ) { | Descriptor |
|---|---|
| ... | |
| scaling_poly_nb_param | u(4) |
| if( scaling_poly_nb_param > 0 ) { | |
|   scaling_poly_symmetric | f(1) |
|   scaling_poly_shift[ sizeId ][ matrixId ] | u(2) |
|   scaling_poly_clip[ sizeId ][ matrixId ] | f(4) |
|   k = n = degree = 0; | |
|   for( i = 0; i < scaling_poly_nb_param; i++ ) { | |
|     scaling_poly_param | i(8) |
|     scaling_poly_coef[ sizeId ][ matrixId ][ n++ ] = scaling_poly_param | |
|     k++ | |
|     if( scaling_poly_symmetric && k > (degree+1) % 2 ) { | |
|       scaling_poly_coef[ sizeId ][ matrixId ][ n++ ] = scaling_poly_param | |
|       k++ | |
|     } | |
|     if( k > degree ) { | |
|       degree++ | |
|       k = 0 | |
|     } | |
|   } | |
| } | |
| ... | |
| } | |

Residuals

As in [JCTVC-H0460], residuals can be added to further improve the fit to a given matrix shape. To optimize coding cost, the number of residuals should be variable, with a scanning order following low-frequency to high-frequency coefficients order, such as up-right diagonal (as in HEVC) or zig-zag (as in AVC), because low-frequency coefficients are often regarded as more critical. Non-coded residuals are inferred to 0.

This can be coded with the following syntax, immediately after polynomial definition:

| scaling_list_data( ) { | Descriptor |
|---|---|
| ... | |
| scaling_residual_nb | ue(v) |
| for( i = 0; i < scaling_residual_nb; i++) { | |
|   scaling_residual_list[ sizeId ][ matrixId ][i] | se(v) |
| } | |
| ... | |
| } | |

In another embodiment, residuals may not be recommended, because of complexity and memory considerations.

Matrix as QP Offset

As in [JCTVC-I0284], quantization matrices can be used as QP offsets (denoted as "QP-offset mode" or "log scale mode" because QP represents quantizer scale in a log scale) rather than scaling factors (denoted as "linear scale mode"), since it brings several advantages:

- Simpler dequantization, by removal of a multiplication, which in turn reduces computation dynamic range. This leaves room for increased accuracy for levScale, which allows its use as $\sqrt{2}$ factor (using an additional QP offset) for some non-square transform normalization, and completely removes multiplications other than levScale.
- Quantization is similarly simplified by the removal of the division by quantization matrix coefficient (usually implemented as a multiplication by inverse of quantization matrix, with accuracy compromise, memory impact, and even more pressure on dynamic range than for dequantization), leaving only multiplication by inverse of levScale.
- It makes sense to unify the representation of all quantization adjustments
- Neutral value (flat matrix) is zero
- Log scale naturally provides better accuracy to low frequency coefficients, which are more critical
- HEVC default matrix formula uses an exponent; log scale representation should be easier to fit with a polynomial. In general, fit is expected to be better in log scale, further reducing the need for residual or a high number of parameters, or even clipping.
- Exponentiation would turn to a multiplication, which is much easier to implement
- Log scale representation being signed (e.g., −128 to +127), dynamic range extension related to clipping may not be needed
- Increased QP granularity, required for smooth matrix definition, also provides better rate control The drawback is the need for finer QP granularity, which impacts at least

- levScale definition,
- delta-QP bit cost for slice header: would barely add two bits
- delta-QP bit cost for coding units. This can be mitigated by introducing a delta-QP scale (in PPS, or slice header), as already proposed in the past (e.g., [JCTVC-C135], D. Hoang, "Flexible scaling of quantization parameter," JCTVC-C135, JCT-VC 3rd Meeting: Guangzhou, CN, Oct. 7-15, 2010), which can actually decrease delta-QP coding cost.
- threshold tables used by deblocking filter
- Lagrange multipliers used at various places Please note that the impact can be limited to levScale if QP granularity is increased for quantization matrices only, as in [JCTVC-I0284].

We further recommend adopting a QP scale with $\frac{1}{16}$ step (as in [JCTVC-A114], J. Jung et al, "Description of video coding technology proposal by France Telecom, NTT, NTT DOCOMO, Panasonic and Technicolor", JCTVC-A114, JCT-VC 1st Meeting: Dresden, Del., Apr. 15-23, 2010) instead of $\frac{1}{6}$, or $\frac{1}{12}$ as in [JCTVC-I0284]. This further simplifies the quantization/dequantization operations, by removing division by 6 and modulo-6 operations, which are replaced by bit mask and shift (no actual operation in hardware). This also eases the implementation of QP offsets.

Then, QP would generally use two more bits as a result of increased accuracy. An appropriate conversion formula can be defined to convert QP values (let us call them $QP_6$) to the new standard ($QP_{16}$). Quantization matrix bit depth can be decreased to 7 bits signed: −64 to +63 range matches the $\frac{1}{16}$ to 16 range of linear-scale matrix definition, with 30% better resolution around the neutral value. This in turn reduces the bit depth of polynomial parameters to 7-bit, leading to lower coding cost, and reduces matrix computation dynamic range as discussed above.

The syntax would be changed to the following (scaling_poly_param reduced to 7-bit):

| scaling_list_data( ) { | Descriptor |
|---|---|
| ... | |
| scaling_poly_nb_param | u(4) |
| if( scaling_poly_nb_param > 0 ) { | |
| scaling_poly_symmetric | f(1) |
| scaling_poly_shift[ sizeId ][ matrixId ] | u(2) |
| scaling_poly_clip[ sizeId ][ matrixId ] | f(4?) |
| for( i = 0; i < scaling_poly_nb_param; i++) { | |
| scaling_poly_param[ i ] | i(7) |
| } | |
| } | |
| ... | |
| s} | |

Figure 26:
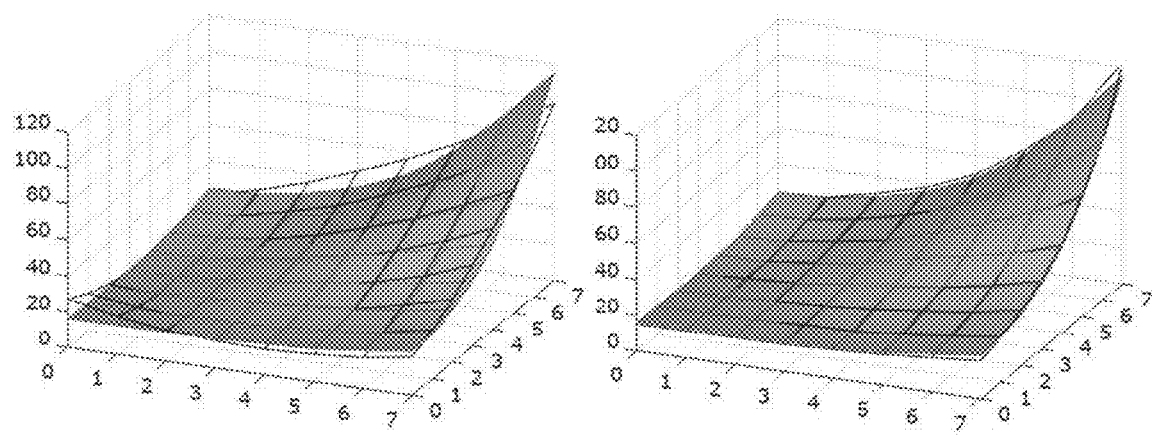
FIG. 26 illustrates the default HEVC intra matrix with 6-parameter fit.

FIG. 26 illustrates the fitting results for the default HEVC intra matrix with 6 parameters. The test is performed without symmetry, shift, nor clipping. The left figure shows the result from using the quantization matrix for linear scaling (51 bits used to encode the quantization matrix), and the right figure shows the result from using the quantization matrix for QP offsets (46 bits used to encode the quantization matrix). Overall, in various tests, fit generally looks better in QP-offset mode, even when evaluated in linear domain.

Default Parameters

Example parameters to match default HEVC 8×8 intra matrix can be found below:

Linear Scale Mode:
  clip=16, Sbase=0, sym=1
  5-parameters (8-bit) $P_i$=[−53, 94, −121, −29, 36]
  7-parameters (8-bit) $P_i$=[6, 8, 18, 0,−17, 1, 21]

QP-Offset Mode:
  clip=0, Sbase=0, sym=1
  4-parameters (7-bit) $P_i$=[−2, −2, 10, 4]
  5-parameters (7-bit) $P_i$=[−27, 32, −26, −7, 8]
  6-parameters (7-bit) $P_i$=[−8, 2, −3, 11, 3, −4]
  7-parameters (7-bit) $P_i$=[1, −17, 38, 21, −16, −5, 9]
  8-parameters (7-bit) $P_i$=[−3, −1, 6, 3, 4, 1, 6, −5]
  9-parameters (7-bit) $P_i$=[0, −8, 10, 14, 3, −7, 6, −5, 2]

Coding default HEVC intra 8×8 matrix with HEVC syntax would take 265 bits (1 bit to code scaling_list_pred_mode_flag, and 264 bits to code the scaling list delta coef values).

For the linear scale mode and QP-offset mode, the coding bit cost and average fitting absolute error for the suggested parameters are analyzed as follows:

4 bits for scaling_poly_nb_param,
  1 bit for scaling_poly_symmetric,
  2 bits for scaling_poly_shift,
  4 bits for scaling_poly_clip, and
  8 or 7 bits for each parameter.

To enable error comparison, error for QP offset mode is computed in linear demain, i.e., by first converting back the QP offsets to scale factors. LF error is the average absolute error for low frequencies half (x+y<8). It can be seen from Table 7 that using 51 bits for the linear scale mode, and 46 bits for the QP offset mode, the error for representing the quantization matrix is small. Thus, compared to 265 bits used by the HEVC standard, the proposed methods achieved a good bit saving in encoding the quantization matrix without a big loss in accuracy. In addition, as also shown in Table 7 the method can be easily scaled, by using more polynomial parameters, to improve the accuracy in representing the quantization matrix.

TABLE 7

| Number of parameters | Linear scale | | | QP offset | | |
|---|---|---|---|---|---|---|
| | Bits | Error | LF error | Bits | Error | LF error |
| 4 | | | | 39 | 1.23 | 0.60 |
| 5 | 51 | 0.89 | 0.89 | 46 | 1.26 | 0.58 |
| 6 | | | | 53 | 0.79 | 0.48 |
| 7 | 67 | 0.50 | 0.36 | 60 | 0.57 | 0.43 |
| 8 | | | | 67 | 0.59 | 0.34 |
| 9 | | | | 74 | 0.66 | 0.23 |

Polynomial coefficients can be obtained by least squares fitting to an existing 8×8 matrix, with constraints on coefficient range, and resulting matrix values. If relevant, lower clipping can be set manually.

In some embodiments, the polynomial can take other forms than what is described above, or be a combination of several sub-polynomials:

x and y can be replaced by u and v, with u=(x+y) and v=(x−y), or even u=(ax+by) and v=(bx−ay), with a+b=1, and a possibly transmitted. For flat-diagonal matrices, all coefficients in v would be zero, and for symmetric matrices (with respect to u axis), all coefficients with odd powers of v would be zero. However, the benefits may be difficult to take advantage of, and an additional parameter (a) may be required.

Two separable polynomials may be combined to generate a matrix, for example, $M(x,y)=P_1(x) \cdot P_2(y)$ or $M(x,y)=P_1(x)+P_2(y)$, with x and y possibly replaced by u and v defined above, and with $P_1$ and $P_2$ defined separately with possibly a different number of parameters for each.

Various methods as described above may be used to modify, e.g., the quantization module and de-quantization module (130, 140, 240) of the encoder 100 and decoder 200 as shown in FIG. 1 and FIG. 2, respectively. Moreover, the present embodiments are not limited to VVC or HEVC, and may be applied to other standards, recommendations, and extensions thereof.

Various methods are described herein, and each of the methods comprises one or more steps or actions for achieving the described method. Unless a specific order of steps or actions is required for proper operation of the method, the order and/or use of specific steps and/or actions may be modified or combined. Unless indicated otherwise, or technically precluded, the aspects described in this application can be used individually or in combination. Various numeric values are used in the present application, for example, the parameter used in bit shifting for integer implementation, and the example polynomial parameters. The specific values are for example purposes and the aspects described are not limited to these specific values.

Figure 27:
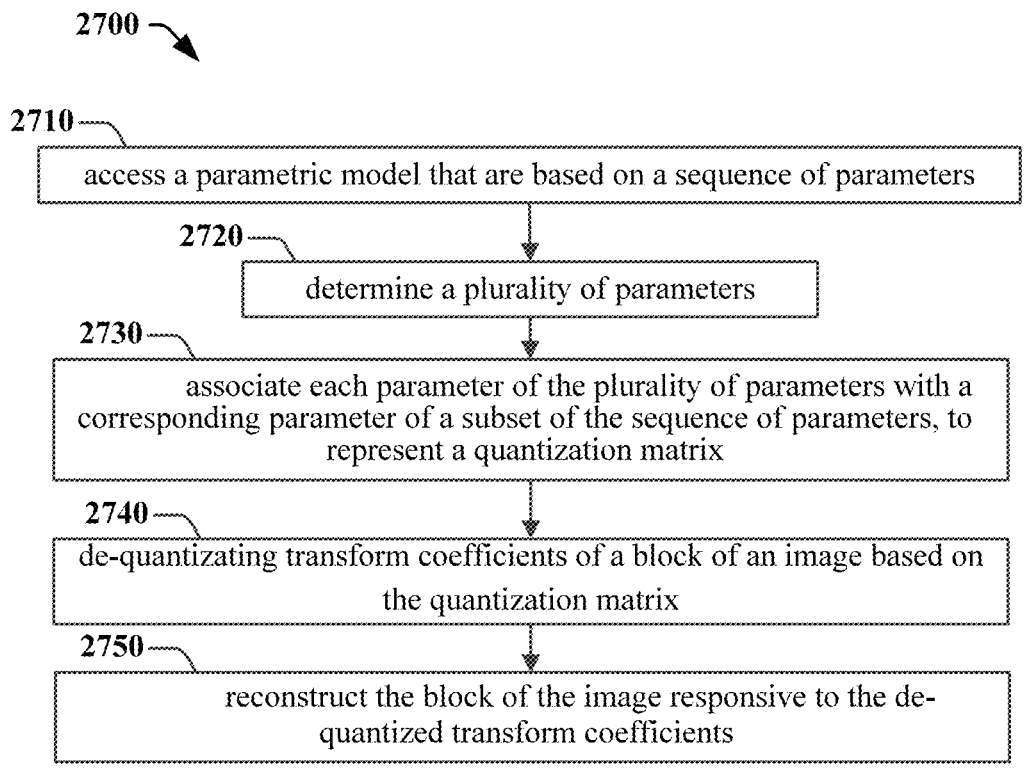
FIG. 27 illustrates a method for generating the QM in an encoder, according to an embodiment.

FIG. 27 illustrates a method (2700) of encoding video data, according to an embodiment. At step 2710, a parametric model based on a sequence of parameters is accessed by the encoder. At step 2720, the encoder determines a plurality of parameters to model the quantization matrix. At step 2730, the encoder associates each parameter of the plurality of parameters with a corresponding parameter of a subset of the sequence of parameters, to represent the quantization matrix. At step 2740, the encoder quantizes transform coefficients of a block of an image based on the quantization matrix. At step 2750, the encoder encodes quantized transform coefficients, for example, using an entropy encoder.

Figure 28:
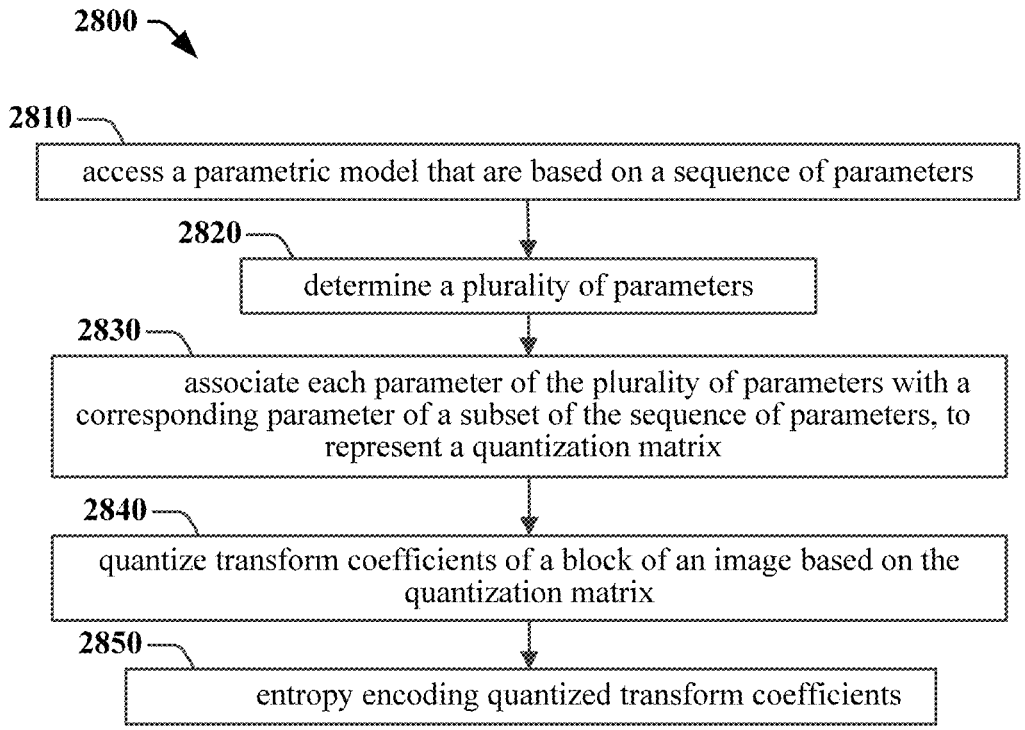
FIG. 28 illustrates a method for generating the QM in a decoder, according to an embodiment.

FIG. 28 illustrates a method (2800) of decoding video data, according to an embodiment. At step 2810, a parametric model based on a sequence of parameters is accessed by the decoder. At step 2820, the decoder determines a plurality of parameters to model the quantization matrix. At step 2830, the decoder associates each parameter of the plurality of parameters with a corresponding parameter of a subset of the sequence of parameters, to represent a quantization matrix. At step 2840, the decoder de-quantizes transform coefficients of a block of an image based on the quantization matrix. At step 2850, the decoder reconstructs the block of the image responsive to the de-quantized transform coefficients.

Figure 29:
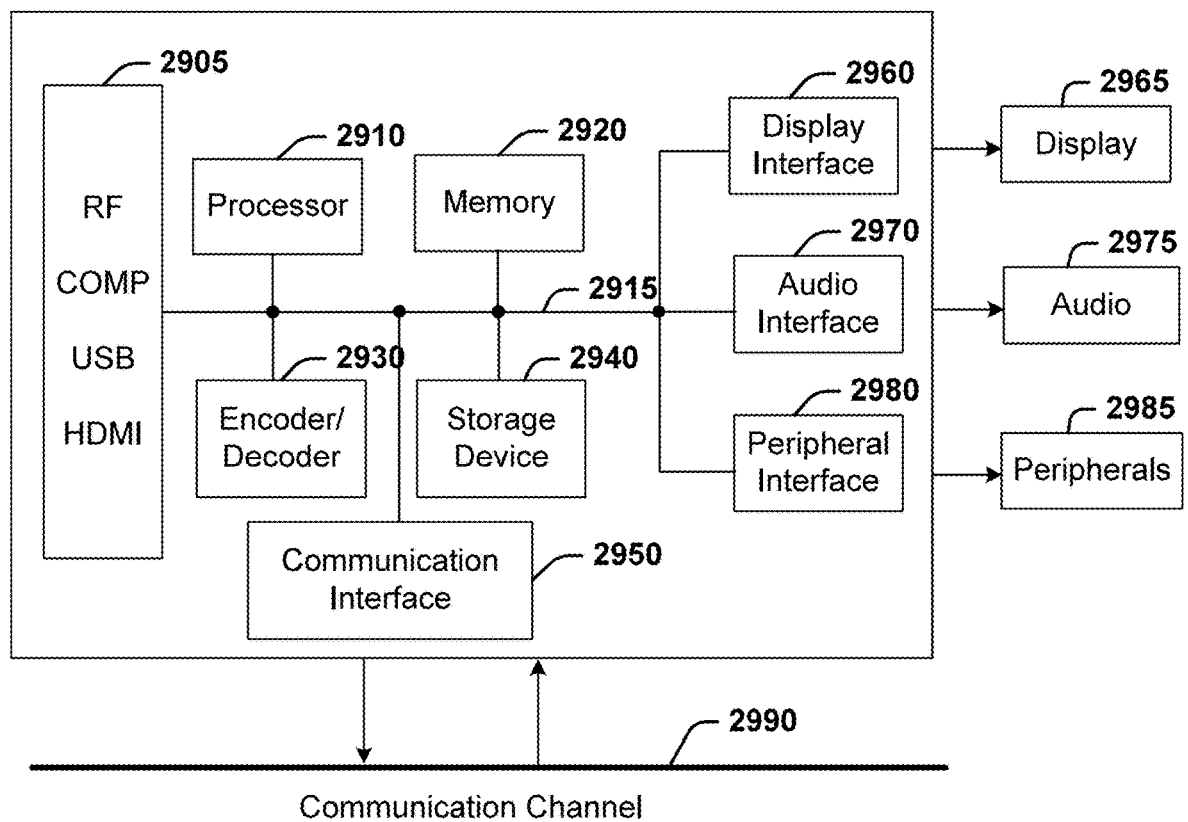
FIG. 29 illustrates a block diagram of a system within which aspects of the present embodiments can be implemented.

FIG. 29 illustrates a block diagram of an example of a system in which various aspects and embodiments are implemented. System 2900 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 2900, singly or in combination, can be embodied in a single integrated circuit, multiple ICs, and/or discrete components. For example, in at least one embodiment, the processing and encoder/decoder elements of system 2900 are distributed across multiple ICs and/or discrete components. In various embodiments, the system 2900 is communicatively coupled to other systems, or to other electronic devices, via, for example, a communications bus or through dedicated input and/or output ports. In various embodiments, the system 2900 is configured to implement one or more of the aspects described in this application.

The system 2900 includes at least one processor 2910 configured to execute instructions loaded therein for implementing, for example, the various aspects described in this application. Processor 2910 can include embedded memory, input output interface, and various other circuitries as known in the art. The system 2900 includes at least one memory 2920 (e.g., a volatile memory device, and/or a non-volatile memory device). System 2900 includes a storage device 2940, which can include non-volatile memory and/or volatile memory, including, but not limited to, EEPROM, ROM, PROM, RAM, DRAM, SRAM, flash, magnetic disk drive, and/or optical disk drive. The storage device 2940 can include an internal storage device, an attached storage device, and/or a network accessible storage device, as non-limiting examples.

System 2900 includes an encoder/decoder module 2930 configured, for example, to process data to provide an encoded video or decoded video, and the encoder/decoder module 2930 can include its own processor and memory. The encoder/decoder module 2930 represents module(s) that can be included in a device to perform the encoding and/or decoding functions. As is known, a device can include one or both of the encoding and decoding modules. Additionally, encoder/decoder module 2930 can be implemented as a separate element of system 2900 or can be incorporated within processor 2910 as a combination of hardware and software as known to those skilled in the art.

Program code to be loaded onto processor 2910 or encoder/decoder 2930 to perform the various aspects described in this application can be stored in storage device 2940 and subsequently loaded onto memory 2920 for execution by processor 2910. In accordance with various embodiments, one or more of processor 2910, memory 2920, storage device 2940, and encoder/decoder module 2930 can store one or more of various items during the performance of the processes described in this application. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 2910 and/or the encoder/decoder module 2930 is used to store instructions and to provide working memory for processing that is needed during encoding or decoding. In other embodiments, however, a memory external to the processing device (for example, the processing device can be either the processor 2910 or the encoder/decoder module 2930) is used for one or more of these functions. The external memory can be the memory 2920 and/or the storage device 2940, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 2900 can be provided through various input devices as indicated in block 2905. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 2905 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 2900 to other electronic devices across USB and/or HDMI connections. It is to be understood that various aspects of input processing, for example, Reed-Solomon error correction, can be implemented, for example, within a separate input processing IC or within processor 2910 as necessary. Similarly, aspects of USB or HDMI interface processing can be implemented within separate interface ICs or within processor 2910 as necessary. The demodulated, error corrected, and demultiplexed stream is provided to various processing elements, including, for example, processor 2910, and encoder/decoder 2930 operating in combination with the memory and storage elements to process the datastream as necessary for presentation on an output device.

Various elements of system 2900 can be provided within an integrated housing, Within the integrated housing, the various elements can be interconnected and transmit data therebetween using suitable connection arrangement 2915, for example, an internal bus as known in the art, including the I2C bus, wiring, and printed circuit boards.

The system 2900 includes communication interface 2950 that enables communication with other devices via communication channel 2990. The communication interface 2950 can include, but is not limited to, a transceiver configured to transmit and to receive data over communication channel 2990. The communication interface 2950 can include, but is not limited to, a modem or network card and the communication channel 2990 can be implemented, for example, within a wired and/or a wireless medium.

Data is streamed to the system 2900, in various embodiments, using a Wi-Fi network such as IEEE 802.11. The Wi-Fi signal of these embodiments is received over the communications channel 2990 and the communications interface 2950 which are adapted for Wi-Fi communications. The communications channel 2990 of these embodiments is typically connected to an access point or router that provides access to outside networks including the Internet for allowing streaming applications and other over-the-top communications. Other embodiments provide streamed data to the system 2900 using a set-top box that delivers the data over the HDMI connection of the input block 2905. Still other embodiments provide streamed data to the system 2900 using the RF connection of the input block 2905.

The system 2900 can provide an output signal to various output devices, including a display 2965, speakers 2975, and other peripheral devices 2985. The other peripheral devices 2985 include, in various examples of embodiments, one or more of a stand-alone DVR, a disk player, a stereo system, a lighting system, and other devices that provide a function based on the output of the system 2900. In various embodiments, control signals are communicated between the system 2900 and the display 2965, speakers 2975, or other peripheral devices 2985 using signaling such as AV.Link, CEC, or other communications protocols that enable device-to-device control with or without user intervention. The output devices can be communicatively coupled to system 2900 via dedicated connections through respective interfaces 2960, 2970, and 2980. Alternatively, the output devices can be connected to system 2900 using the communications channel 2990 via the communications interface 2950. The display 2965 and speakers 2975 can be integrated in a single unit with the other components of system 2900 in an electronic device, for example, a television. In various embodiments, the display interface 2960 includes a display driver, for example, a timing controller (T Con) chip.

The display 2965 and speaker 2975 can alternatively be separate from one or more of the other components, for example, if the RF portion of input 2905 is part of a separate set-top box. In various embodiments in which the display 2965 and speakers 2975 are external components, the output signal can be provided via dedicated output connections, including, for example, HDMI ports, USB ports, or COMP outputs.

According to an embodiment, a method for video decoding is presented, comprising:

accessing a parametric model that is based on a sequence of parameters; determining a plurality of parameters that correspond to a subset of said sequence of parameters; associating each parameter of said plurality of parameters with a corresponding parameter of said subset of said sequence of parameters, to represent a quantization matrix; de-quantizing transform coefficients of a block of an image based on said quantization matrix; and reconstructing said block of said image responsive to said de-quantized transform coefficients.

According to another embodiment, a method for video encoding is presented, comprising: accessing a parametric model that is based on a sequence of parameters; determining a plurality of parameters that correspond to a subset of said sequence of parameters; associating each parameter of said plurality of parameters with a corresponding parameter of said subset of said sequence of parameters, to represent a quantization matrix; quantizing transform coefficients of a block of an image based on said quantization matrix; and entropy encoding quantized transform coefficients.

According to another embodiment, an apparatus for video decoding is presented, comprising one or more processors, wherein said one or more processors are configured to: access a parametric model that is based on a sequence of parameters; determine a plurality of parameters that correspond to a subset of said sequence of parameters; associate each parameter of said plurality of parameters with a corresponding parameter of said subset of said sequence of parameters, to represent a quantization matrix; de-quantize transform coefficients of a block of an image based on said quantization matrix; and reconstruct said block of said image responsive to said de-quantized transform coefficients. The apparatus can further comprise one or more memories coupled to said one or more processors.

According to another embodiment, an apparatus for video encoding is presented, comprising one or more processors, wherein said one or more processors are configured to: access a parametric model that is based on a sequence of parameters; determine a plurality of parameters that correspond to a subset of said sequence of parameters; associate each parameter of said plurality of parameters with a corresponding parameter of said subset of said sequence of parameters, to represent a quantization matrix; quantize transform coefficients of a block of an image based on said quantization matrix; and entropy encode quantized transform coefficients. The apparatus can further comprise one or more memories coupled to said one or more processors.

According to another embodiment, a signal is formatted to include: a value indicating a number of parameters in a plurality of parameters; said plurality of parameters, wherein each parameter of said plurality of parameters is associated with a corresponding parameter of a subset of a sequence of parameters, to represent a quantization matrix, wherein a parametric model is based on said sequence of parameters; and transform coefficients of a block of an image quantized based on said quantization matrix.

According to one embodiment, a value is encoded or decoded to indicate the number of parameters in said plurality of parameters. Usually, as the number of parameters increases, the quantization matrix becomes more complex.

According to one embodiment, the parametric model corresponds to a polynomial in (x, y), where x and y indicate matrix coordinates, said sequence of parameters corresponding to an ordered sequence of polynomial coefficients, said polynomial being defined by said ordered sequence of polynomial coefficients and an ordered sequence of terms.

According to one embodiment, said ordered sequence of polynomial coefficients are symmetrical in x and y.

According to one embodiment, a set of polynomial coefficients is decoded from a bitstream, wherein said ordered sequence of polynomial coefficients is determined responsive to said decoded set of polynomial coefficients.

According to one embodiment, a value indicating a degree of said polynomial is encoded or decoded, wherein said value indicating the number of parameters is obtained from said value indicating said degree. In one example, the degree of said polynomial is set to 4.

According to one embodiment, there is a one-to-one correspondence between said ordered sequence of polynomial coefficients and said ordered sequence of terms.

According to one embodiment, said polynomial is represented as $$\begin{aligned} M(x, y) = P_0 & + \\ P_1 x \quad & + \quad P_2 y \quad + \\ P_3 xy \quad & + \quad P_4 x^2 \quad + \quad P_5 y^2 \quad + \\ P_6 x^2 y \quad & + \quad P_7 xy^2 \quad + \quad P_8 x^3 \quad + \quad P_9 y^3 \quad + \\ P_{10} x^2 y^2 \quad & + \quad P_{11} x^3 y \quad + \quad P_{12} xy^3 \quad + \quad P_{13} x^4 \quad + \quad P_{14} y^4 \quad + \\ \ldots & \end{aligned}$$

According to one embodiment, one or more parameters in said sequence of parameters, other than said subset of parameters, are set to respective default values. In one example, the default values are set to 0.

According to one embodiment, said polynomial is a fully developed polynomial.

According to one embodiment, said ordered sequence of terms is ordered by increasing degree of terms.

According to one embodiment, said ordered sequence of terms is further ordered by an increasing maximum of x and y exponents.

According to one embodiment, said ordered sequence of terms is further ordered by increasing x or y exponent.

According to one embodiment, a k-th parameter of said plurality of parameters is associated with a k-th term of said ordered sequence of terms.

According to one embodiment, said matrix coordinates are normalized. Normalization can be performed as $$x = N \frac{x'}{size_x}, y = N \frac{y'}{size_y},$$

where x' and y' are the indices of the columns and rows of the quantization matrix, $size_x$ is the horizontal size of the matrix, $size_y$ is the vertical size of the matrix, and N is a normalization value. In one example, N is set to 2.

According to one embodiment, said quantization matrix is used for quantizer step scaling or for quantizer parameter offset.

According to one embodiment, matrix coefficients are computed by an integer process comprising limiting left-shifted polynomial terms to n bits by dropping most significant bits (including the sign bit), then adding them together using adders also restricted to n-bit output (still by dropping MSBs), and right-shifting the result by a value smax-sbase to obtain a matrix coefficient, n being equal to matrix coefficient bitdepth (mbd) plus maximum allowed value of (smax-sbase).

According to one embodiment, when a matrix coefficient is further clipped to a minimum value, bit depth before clipping may be increased by one to retain a sign bit, and in that case said n is increased by one.

According to one embodiment, said polynomial in (x,y) corresponds to one polynomial in x and one polynomial in y.

According to one embodiment, variables x and y are replaced by u and v, with u=(x+y) and v=(x−y).

According to one embodiment, variables x and y are replaced by u and v, with u=(ax+by) and v=(bx−ay), with a+b=1.

According to one embodiment, two separable polynomials are combined to generate a quantization matrix, for example $M(x,y)=P_1(x) \cdot P_2(y)$ or $M(x,y)=P_1(x)+P_2(y)$.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method of video decoding, comprising:
   decoding at least a syntax element representing a value N, where N indicates a number of polynomial coefficients, N being selected from among a plurality of values;
   obtaining N polynomial coefficients;
   forming a polynomial function with N monomials, wherein said polynomial function is a function of matrix coordinates, and wherein each one of said N polynomial coefficients is associated with a corresponding monomial of said. N monomials;
   obtaining a quantization matrix based on said polynomial function of matrix coordinates; and
   decoding a block of a picture based on said quantization matrix.

2. The method of claim 1, wherein a k-th polynomial coefficient of said N polynomial coefficients is associated with a k-th monomial of said N monomials.

3. The method of claim 1, further comprising:
   decoding a set of polynomial coefficients, wherein said N polynomial coefficients are determined responsive to said decoded set of polynomial coefficients.

4. The method of claim 1, wherein said monomials are ordered by an increasing maximum of x and y exponents, where x and y indicate matrix coordinate.

5. The method of claim 1, wherein said monomials are ordered by increasing x or y exponent, where x and y indicate matrix coordinate.

6. The method of claim 1, wherein said polynomial function is a function of a first variable and a second variable, wherein said first variable is a linear combination of horizontal coordinate and vertical coordinate, and wherein said second variable is a linear combination of horizontal coordinate and vertical coordinate.

7. An apparatus for video decoding, comprising:
   one or more processors, wherein said one or more processors are configured to:
   decode at least a syntax element representing a value N, where N indicates a number of polynomial coefficients, N being determined from among a plurality of values;
   obtain N polynomial coefficients;
   form a polynomial function with N monomials, wherein said polynomial function is a function of matrix coordinates, and wherein each one of said N polynomial coefficients is associated with a corresponding monomial of said N monomials;
   obtain a quantization matrix based on said polynomial function of matrix coordinates; and
   decode a block of a picture based on said quantization matrix.

8. The apparatus of claim 7, wherein a k-th polynomial coefficient of said N polynomial coefficients is associated with a k-th monomial of said N monomials.

9. The apparatus of claim 7, wherein said one or more processors are further configured to decode a set of polynomial coefficients, wherein said N polynomial coefficients are determined responsive to said decoded set of polynomial coefficients.

10. The apparatus of claim 7, wherein said monomials are ordered by an increasing maximum of x and y exponents, where x and y indicate matrix coordinate.

11. The apparatus of claim 7, wherein said monomials are ordered by increasing x or y exponent, where x and y indicate matrix coordinate.

12. The apparatus of claim 7, wherein said polynomial function is a function of a first variable and a second variable, wherein said first variable is a linear combination of horizontal coordinate and vertical coordinate, and wherein said second variable is a linear combination of horizontal coordinate and vertical coordinate.

13. The method of video encoding, comprising:
    determining a value N, indicating a number of polynomial coefficients;
    encoding at least a syntax element representing said value N;
    obtaining N polynomial coefficients;
    forming a polynomial function with N monomials, wherein said polynomial function is a function of matrix coordinates, and wherein each one of said N polynomial coefficients is associated with a corresponding monomial of said N monomials;
    obtaining a quantization matrix based on said polynomial function of matrix coordinates; and
    encoding a block of a picture based on said quantization matrix.

14. The method of claim 13, wherein a k-th polynomial coefficient of said N polynomial coefficients is associated with a k-th monomial of said N monomials.

15. The method of claim 13, further comprising:
    encoding a set of polynomial coefficients, wherein said. N polynomial coefficients are determined responsive to said set of polynomial coefficients.

16. The method of claim 13, wherein said polynomial function is a function. of a first variable and. a second variable, wherein said first variable is a linear combination of horizontal coordinate and vertical coordinate, and wherein said second variable is a linear combination of horizontal coordinate and vertical coordinate.

17. An apparatus for video encoding, comprising:
    one or more processors, wherein said one or more processors are configured to:
    determine a value N, indicating a number of polynomial coefficients;
    encode at least a syntax element representing said value N;
    obtain N polynomial coefficients;
    form a polynomial function with N monomials, wherein said polynomial function is a function of matrix coordinates, and wherein each one of said N polynomial coefficients is associated with a corresponding monomial of said. N monomials;
    obtain a quantization matrix based on said polynomial function of matrix coordinates; and
    encode a block of a picture based on said quantization matrix.

18. The apparatus of claim 17, wherein a k-th polynomial coefficient of said N polynomial coefficients is associated with a k-th monomial of said N monomials.

19. The apparatus of claim 17, said one or more processors are further configured to encode a set of polynomial coefficients, wherein said N polynomial coefficients are determined responsive to said set of polynomial coefficients.

20. The apparatus of claim 17, wherein said polynomial function is a function of a first variable and a second variable, wherein said first variable is a linear combination of horizontal coordinate and vertical coordinate, and wherein said second variable is a linear combination of horizontal. coordinate and vertical coordinate.

* * * * *